US008739231B2

(12) United States Patent
Ganesan et al.

(10) Patent No.: US 8,739,231 B2
(45) Date of Patent: May 27, 2014

(54) SYSTEM AND METHOD FOR DISTRIBUTED VIDEO-ON-DEMAND

(75) Inventors: Prasanna Ganesan, Menlo Park, CA (US); Tony Miranz, Palo Alto, CA (US); Alain Rossmann, Palo Alto, CA (US)

(73) Assignee: Vudu, Inc., Santa Clara, CA (US)

( * ) Notice: Subject to any disclaimer, the term of this patent is extended or adjusted under 35 U.S.C. 154(b) by 1091 days.

(21) Appl. No.: 11/210,272

(22) Filed: Aug. 23, 2005

(65) Prior Publication Data

US 2007/0056002 A1    Mar. 8, 2007

(51) Int. Cl.
*H04N 7/173* (2011.01)
(52) U.S. Cl.
USPC ............... 725/93; 725/86; 725/87; 725/95; 725/90; 725/100
(58) Field of Classification Search
USPC ............ 725/115, 42, 86–87, 93–95, 90, 110; 386/87; 709/231
See application file for complete search history.

(56) References Cited

U.S. PATENT DOCUMENTS

| 5,132,992 | A | 7/1992 | Yurt et al. |
| 5,530,754 | A | 6/1996 | Garfinkle |
| RE35,651 | E | 11/1997 | Bradley et al. |
| 5,729,280 | A | 3/1998 | Inoue et al. |
| 5,758,151 | A * | 5/1998 | Milligan et al. ............... 1/1 |
| 5,798,785 | A | 8/1998 | Hendricks et al. |
| 5,812,123 | A | 9/1998 | Rowe et al. |
| 5,826,168 | A | 10/1998 | Inoue et al. |
| 5,831,662 | A | 11/1998 | Payton |
| 5,838,314 | A | 11/1998 | Neel et al. |
| 5,886,730 | A | 3/1999 | Tsosie |
| 6,005,565 | A | 12/1999 | Legall et al. |
| 6,177,931 | B1 | 1/2001 | Alexander et al. |
| 6,263,504 | B1 | 7/2001 | Ebisawa |
| 6,285,987 | B1 | 9/2001 | Roth et al. |
| 6,324,519 | B1 * | 11/2001 | Eldering ........................ 705/14 |
| 6,515,680 | B1 | 2/2003 | Hendricks et al. |
| 6,622,305 | B1 | 9/2003 | Willard |
| 6,701,528 | B1 * | 3/2004 | Arsenault et al. ............ 725/89 |
| 6,718,551 | B1 | 4/2004 | Swix et al. |
| 6,728,763 | B1 | 4/2004 | Chen |
| 6,801,947 | B1 | 10/2004 | Li |
| 7,024,679 | B1 | 4/2006 | Sie et al. |
| 7,080,400 | B1 * | 7/2006 | Navar ........................ 725/139 |
| 7,246,369 | B1 * | 7/2007 | Duan et al. ................... 725/115 |
| 7,281,261 | B2 | 10/2007 | Jaff et al. |
| 7,293,275 | B1 | 11/2007 | Krieger et al. |

(Continued)

OTHER PUBLICATIONS

U.S. Appl. No. 11/974,138, filed Oct. 11, 2007, Ganesan et al.

(Continued)

*Primary Examiner* — Brian T Pendleton
*Assistant Examiner* — Alan Luong
(74) *Attorney, Agent, or Firm* — David R. Stevens; Stevens Law Group

(57) ABSTRACT

Various techniques for providing a video-on-demand (VOD) system based on distributed networks are disclosed. According to one aspect of the VOD system, individual client devices on a network are identified to supply each other with needed sources in pieces to render required services. As a result, the loading pressure on a central server or centralized servers is distributed into the network. A VOD system so contemplated can sustain a substantial growth in its subscribers.

14 Claims, 24 Drawing Sheets

(56) References Cited

U.S. PATENT DOCUMENTS

| | | | |
|---|---|---|---|
| 2001/0024239 A1 | 9/2001 | Feder et al. | |
| 2001/0042249 A1* | 11/2001 | Knepper et al. | 725/42 |
| 2002/0129375 A1 | 9/2002 | Kim et al. | |
| 2002/0154892 A1* | 10/2002 | Hoshen et al. | 386/87 |
| 2002/0162109 A1 | 10/2002 | Shteyn | |
| 2003/0026254 A1* | 2/2003 | Sim | 370/392 |
| 2003/0040962 A1 | 2/2003 | Lewis | |
| 2003/0046698 A1 | 3/2003 | Kamen et al. | |
| 2003/0051249 A1* | 3/2003 | Hoang | 725/95 |
| 2003/0084461 A1 | 5/2003 | Hoang | |
| 2003/0115597 A1 | 6/2003 | Yassin et al. | |
| 2003/0126277 A1 | 7/2003 | Son et al. | |
| 2003/0188316 A1 | 10/2003 | DePrez | |
| 2003/0204856 A1 | 10/2003 | Buxton | |
| 2003/0208612 A1* | 11/2003 | Harris et al. | 709/231 |
| 2004/0117831 A1 | 6/2004 | Ellis et al. | |
| 2004/0122741 A1 | 6/2004 | Sidman | |
| 2004/0128343 A1 | 7/2004 | Mayer | |
| 2004/0133923 A1 | 7/2004 | Watson et al. | |
| 2004/0148634 A1* | 7/2004 | Arsenault et al. | 725/89 |
| 2004/0216164 A1 | 10/2004 | Hayhurst | |
| 2005/0005241 A1 | 1/2005 | Hunleth et al. | |
| 2005/0033856 A1* | 2/2005 | Li | 709/231 |
| 2005/0076363 A1 | 4/2005 | Dukes et al. | |
| 2005/0086696 A1 | 4/2005 | Daniels | |
| 2005/0289593 A1 | 12/2005 | Spilo | |
| 2006/0026639 A1 | 2/2006 | Potrebic et al. | |
| 2006/0031537 A1 | 2/2006 | Boutboul et al. | |
| 2006/0075453 A1 | 4/2006 | Choi | |
| 2006/0190615 A1 | 8/2006 | Panwar et al. | |
| 2006/0218088 A1 | 9/2006 | Flora et al. | |
| 2006/0248078 A1 | 11/2006 | Gross et al. | |
| 2009/0019489 A1 | 1/2009 | Ohlfs et al. | |
| 2010/0138868 A1* | 6/2010 | Sie et al. | 725/46 |

OTHER PUBLICATIONS

"Video-on-Demand Research", printable at http://www.cs.ndsu.nodak.edu/-rvetter|ATM/html/video.html.

Final Office Action mailed Jan. 2, 2009 in U.S. Appl. No. 11/226,625, 23 pgs.

Jehan-Francois Paris et al., "Zero-Delay Broadcasting Protocols for Video-on-Demand," Proceedings of the 7th ACM International Conference on Multimedia '99, Oct. 30-Nov. 5, 1999, Orlando, FL, USA. ACM,1999, vol. 1.

Non-Final Office Action mailed Jul. 9, 2008 in U.S. Appl. No. 11/226,625, 20 pgs.

Rush_Hour_2_Movie_Poster.pdf, www.imdb.com Key Word: "Rush Hour 2".

"Google-2005-ScreenShot (Google Inc., Copyright 2005; http://web.archive.org/web/200601 01175628/www.google.com/, 3 pages)."

Decision on Petition to Make Special dated Dec. 18, 2007 in U.S. Appl. No. 11/974,138, 2 pgs.

International Search Report and Written Opinion of the International Searching Authority in International Application PCT/US2008/071735, European Patent Office, Feb. 19, 2009, 11 pages.

Non-Final Office Action dated Jul. 17, 2009 in U.S. Appl. No. 11/226,625, 21 pgs.

Non-Final Office Action dated Jun. 26, 2008 in U.S. Appl. No. 11/203,021, 15 pgs.

Non-Final Office Action dated Jun. 25, 2008 in U.S. Appl. No. 11/458,385, 9 pgs.

Non-Final Office Action dated Oct. 7, 2008 in U.S. Appl. No. 11/383,751, 8 pgs.

Petition to Make Special dated Oct. 10, 2007 in U.S. Appl. No. 11/974,138, 9 pgs.

Final Offce Action dated Feb. 17, 2010 in U.S. Appl. No. 11/226,625, 24 pages.

Non-Final Office Action dated Jun. 16, 2010 in U.S. Appl. No. 11/226,625; 21 pages.

Non-Final Office Action dated May 25, 2010 in U.S. Appl. No. 11/974,138 , 11 pages.

Final Office Action dated Nov. 19, 2010 in U.S Appl. No. 11/226,625; 26 pages.

Final Office Action dated Nov. 9, 2010 in U.S. Appl. No. 11/974,138; 17 pages.

Non-Final Office Action dated Dec. 14, 2011 in U.S. Appl. No. 11/974,138.

Non-Final Office Action dated Jul. 19, 2010 in U.S. Appl. No. 11/226,625.

* cited by examiner

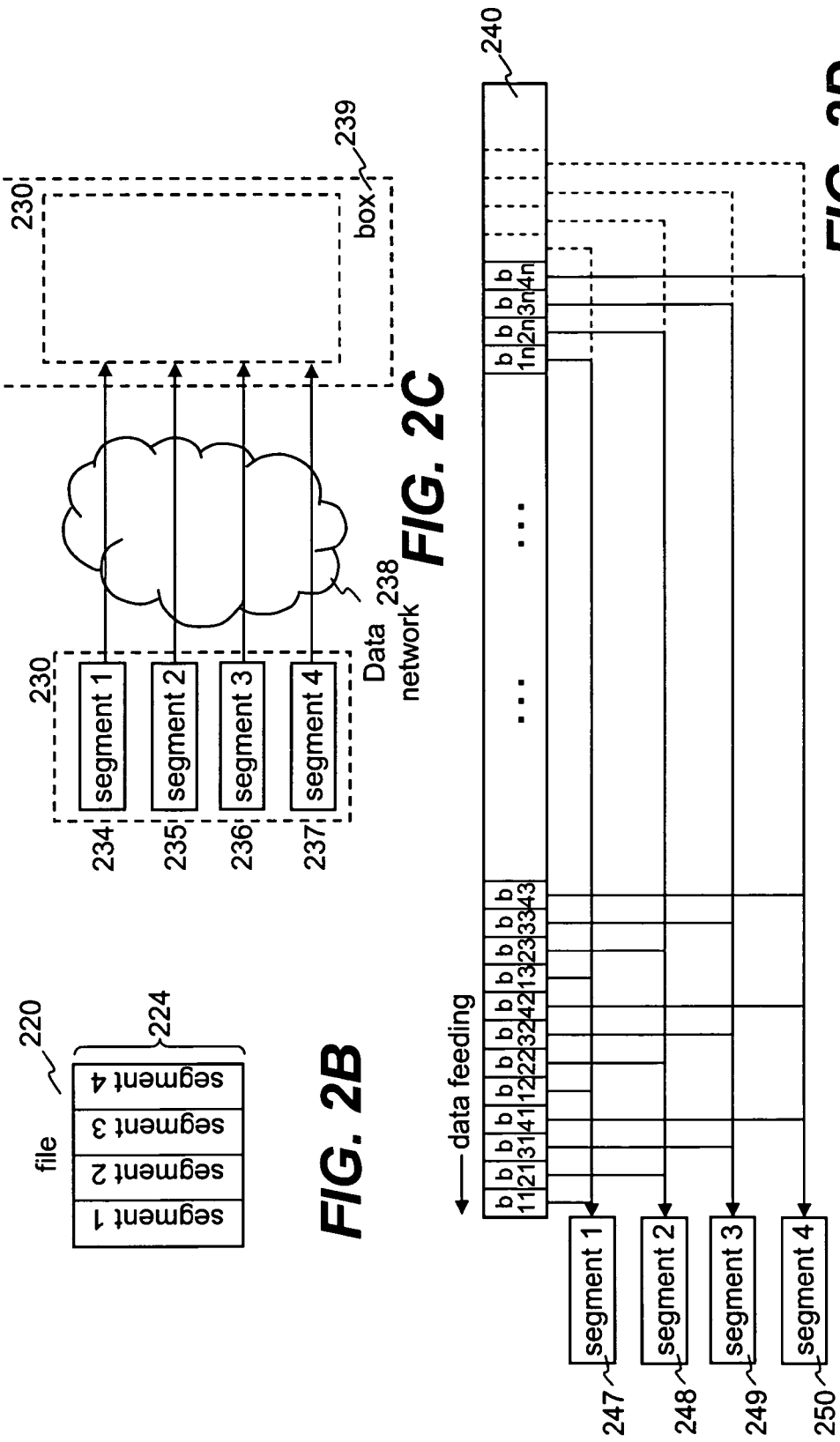

FIG. 6B

| Local machine | IP Address | Time-fill (1~5000) | title1 | title2 | ... | title 5000 |
|---|---|---|---|---|---|---|
| Box 1 | address 1 | Program1 | seg1 seg3 | seg4 | | seg4 |
| Box 2 | address 2 | Program2 | seg3 seg4 | seg1 | | |
| Box 3 | address 3 | Program3 | seg2 seg3 | seg4 | | |
| ... | | | | | | |
| Box N | address n | Program4 | seg1 seg3 | seg3 | | seg1 |

FIG. 6C (650)

| | box1 | box2 | box3 | box4 |
|---|---|---|---|---|
| seg1 | IPA1 | | | |
| seg2 | | IPA2 | | |
| seg3 | | | IPA3 | |
| seg4 | | | | IPA4 |

FIG. 6D (652)

| | box1 | back up | box2 | back up | box3 | back up | box4 | back up |
|---|---|---|---|---|---|---|---|---|
| seg1 | IPA1 | IPA | | | | | | |
| seg2 | | | IPA2 | IPA | | | | |
| seg3 | | | | | IPA3 | IPA | | |
| seg4 | | | | | | | IPA4 | IPA |

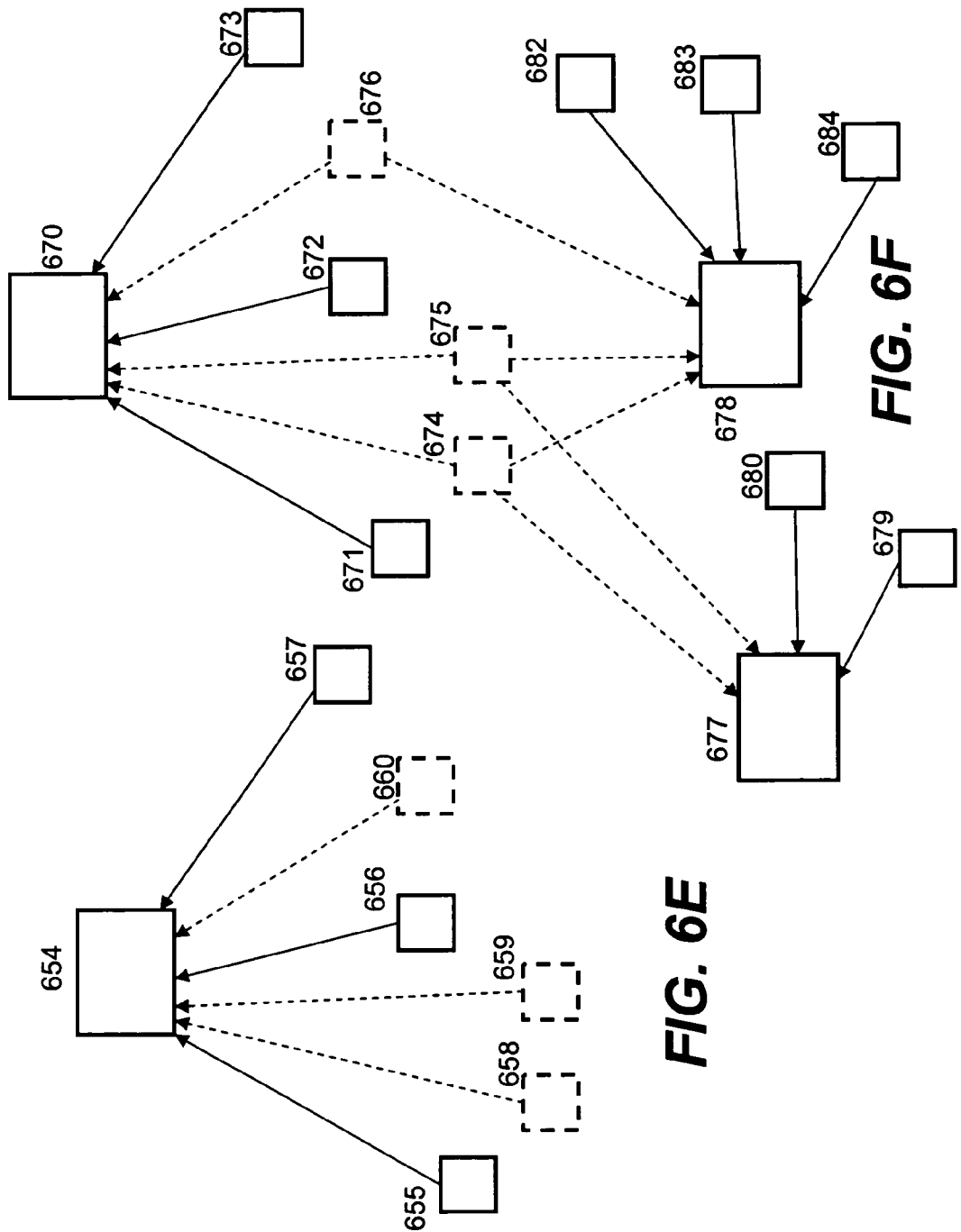

SYSTEM AND METHOD FOR DISTRIBUTED VIDEO-ON-DEMAND

BACKGROUND

The present invention is generally related to multimedia delivery over the Internet. Particularly, the present invention is related to techniques, when properly combined, for providing video-on-demand (VOD) including services, systems and methods for the same. Further, the present invention is related to techniques for utilizing the computing and bandwidth capacity on the client side.

DESCRIPTION OF THE RELATED ART

Whether it is an elder telling a story by the fire or a family sitting in front of the television during dinner, humans have an innate need to hear stories and to be entertained. It is unbelievable how many televisions and/or radios each household has. In fact, it is estimated that every household has 2.3 televisions and that people watch television an average of five (5) hours per day. These statistics and human propensities motivate cable providers, satellite providers, video rental companies, Blockbuster Inc., NetFlix.com, etc. to invest millions of dollars to offer videos, television and movie broadcasts, premium movie channels, pay-per-view, etc. to customers.

Traditionally, each television viewer was satisfied to have four (4) or five (5) television channels offering a few shows and to go to the cinema for more exciting movie content. However, today's audiences have become more demanding, expecting so much more from television at home, including a large variety of more sophisticated dramas, comedies, adventures, horrors, etc. To satisfy this demand, the majority of television viewers subscribe to cable or satellite services, the basic service alone offering significantly more channels and premium broadcasts than regular television.

Still, customers remain unsatisfied. In response, cable and satellite services offer movie channel subscriptions. Each movie channel offers a limited number of relatively new releases of movie broadcasts at pre-selected times. A viewer can review movie lists and movie schedules, and plan to watch selected movies when they are offered. If the viewer turns on the television at the right time, the viewer can watch the movie from the beginning. Otherwise, the viewer may have to watch the movie starting from some other point. Alternatively, the viewer can record movies to watch at times more convenient to the viewer (whether using digital video recorders such as that offered by TiVo Inc. or traditional VCRs). Since the number of movies offered by these movie channels are limited, more disciplined viewers may record all desirable movies currently being provided and have to wait until additional titles come available. Since the number of movies offered on movie channels is limited and since the movies start at irregular times, movie channels do not effectively satisfy current customer demand.

Customer appeal of "video-on-demand" is well known. Ideally, a server or set of servers will store all movies, will enable customers to select movies, and will stream the movies to the consumers while the customers view the movies without network interruption. However, given the many shortcomings of today's technology and network-related infrastructure, such video on demand will not be available to the general public until faster and significantly more reliable and predictable communication channels (e.g., fiber optics) are deployed.

FIG. 1 illustrates an overview of current video-on-demand architecture. A video delivery system 100 is provided for delivering video services over a network. The video delivery system 100 includes a video server 102 that is sometimes referred to as a head-end. Through a data network 104, the video server 102 can provide continuous, scheduled and video-on-demand (VOD) services to respective client machines 106-1, 106-2, . . . 106-n (i.e., its subscribers). Hence, the system 100 is a typical client-server architecture with one server 102 serving a plurality of client machines 106-1, 106-2, . . . 106-n. The server 102 is further coupled to a media storage device 112 that may be configured to store various media files (e.g., movies or news footage). The media storage device 112 must be on-line and must store and supply titles scheduled or demanded for delivery to any of the client machines 106-1, 106-2, . . . 106-n.

To ensure the quality of service (QoS), the bandwidth requirement of the network path (e.g., 108-1, 108-2, . . . 108-n) to each of the client machines 106-1, 106-2, . . . 106-n has to be sufficient. However, as the number of the subscribers continues to increase, the demand on the bandwidth of the backbone network path 110 increases linearly, and the overall cost of the system 100 increases considerably at the same time. If the server has a fixed bandwidth limit and system support capability, an increase in the number of subscribers beyond a certain threshold will result in slower transfer of data to clients. In other words, the transmission of the video data over the network 104 to the subscribers via the client machines 106-1, 106-2, . . . 106-n is no longer guaranteed. When the video data is not received in a client machine on time, the display of the video data may fail or at least become jittery.

To alleviate such loading problems to the video server 102, a video delivery system often employs multiple video servers, perhaps in multiple locations. Each of the video servers, similar to the video server 102, is configured to support a limited number of subscribers. Whenever the number of subscribers goes beyond the capacity of a video server or the bandwidth thereof, an additional video server needs to be deployed or additional bandwidth needs to be allocated. Subsequently, the overall costs can go up considerably when more subscribers sign up with the video delivery system 100.

There, thus, is a great need for a VOD system that is relatively independent from the number of users. As a result, the overall performance, costs as well as the complexities of such a VOD system may sustain a substantial growth in its subscribers.

SUMMARY

This section is for the purpose of summarizing some aspects of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, the invention relate to techniques for providing media services, particularly video-on-demand (VOD), over a network. The techniques described herein are related to each other and each is believed independently novel in the art. The disclosed techniques may be performed alone or in any combination to provide a novel and unobvious system or a portion of a system. It should be understood that the techniques in combination yield an equally independently novel combination as well, even if combined in their broadest sense; i.e. with less than the specific manner in which each of the techniques has been reduced to practice.

According to one aspect of the present invention, a VOD system is provided on a distributed network. Significantly different from the prior art systems in which media services are rendered at a central server or centralized servers, the present invention utilizes individual devices on a network to supply each other with needed sources in pieces to render required services. As a result, the loading pressure on the central server or centralized servers is distributed into the network. A VOD system contemplated in accordance with the present invention can sustain a substantial growth in its subscribers.

According to another aspect of the invention, a file pertaining to a title is fragmented into several tails or segments. None or at least one of the segments are distributed in each of the client machines or boxes in service. When a title is ordered from a box, the segments, if not locally available, are streamed in or continuously fetched respectively from other boxes that have the segments. Data from the segments being concurrently fetched is multiplexed together with data from segments cached locally, if any, to facilitate the playback of the title.

According to still another aspect of the present invention, a time-fill program is automatically launched after an order for a tile is placed. As the name suggests, a time-fill program provides a time frame during which sufficient data from the segments being concurrently fetched can be received to support a smooth and continuous playback of the ordered title. Depending on implementation, the time-fill program may include pictures, texts, trailers, previews, or commercial information, and may be configured in accordance with the ordered title. The length of the time-fill program can be so determined that a certain predefined amount of data from the distributed segments has been received or a certain defined amount of time has transpired.

According to still another aspect of the present invention, a large file is fragmented intelligently and the segments are so distributed as to best utilize the network bandwidth and maximize quality of service (QoS). The number of segments is computed or determined periodically in accordance with the required transmission rate of the title, the minimum available network speeds, etc.

According to still another aspect of the present invention, boxes either newly installed or put back onto the network after a period of time are updated efficiently, e.g., in a shortest possible time, to start providing services. An original library in such a box is updated with the most demanded titles first or the least amount of data possible so that the box may be in condition sooner to not only fulfill orders for the most demanded titles but also provide needed data to other boxes. Depending on implementation, the updating of the original library in a box may be carried out by receiving data chunks by a gossip protocol from other boxes that collectively have the latest titles or receiving proper release packages from a service provider via a broadcasting or multicasting infrastructure.

According to still another aspect of the present invention, backup boxes are provided to support boxes designated to provide data to an ordering box such that all data being transported among boxes is not delayed or interrupted. Should one of the boxes providing the data to the ordering box underperform (e.g., due to operational issues in the box or undesirable network performance) or fail, a backup box may be launched to replace or assist the underperforming box and to continue the supply of data to the ordering box. Other aspects of the invention will become apparent and appreciated by those skilled in the art from the detailed description herein.

Embodiments of the invention may be implemented in numerous ways, including a method, system, device, or a computer readable medium. Several embodiments of the invention are discussed below. In one embodiment, the present invention is a method for providing VOD services, the method comprises a server receiving a request from an ordering box remotely located, the request including an order of a title in a library that includes a substantial number of titles, each of the titles pertaining to a file being a collection of data together with any auxiliary data, wherein at least some of the file for the title is not locally available; and determining source information in accordance with the request, the source information including information about several boxes from which the at least some of the file can be respectively retrieved at substantially similar time by the ordering box to facilitate a playback of the title. If the embodiment requires the ordering box to initiate respective downloading requests to the several boxes, the server responds to the request by sending the source information back to the ordering box that is configured to proceed with downloading collectively the some of the file from the several boxes at substantially similar time. If the embodiment requires the several boxes to initiate respective uploading requests to the ordering box, the server responds to the request by sending the source information to the several boxes that are respectively configured to proceed with uploading collectively the at least some of the file to the ordering box.

In another embodiment, the present invention is a method for providing VOD services, the method comprises enabling selection of a title from a library including a substantial number of titles in a box; generating a request when the title is ordered; transmitting the request over a network to a server configured to formulate a response, the response including source information identifying several boxes to provide one or more distributed segments pertaining to the ordered title; initiating a playback of a time-fill program in the box; and determining automatically when to start a playback of the ordered title after starting to receive the one or more distributed segments respectively from the several boxes. The method further comprises determining locally whether a user is authenticated to proceed with the ordered title before generating the request; or determining remotely whether a user has been permitted to proceed with the playback of the ordered title.

In still another embodiment, the present invention is a system for providing VOD services, the system comprises a plurality of boxes, respectively coupled to a network, each box providing a library of titles, each box including a storage space allowing a plurality of segments to reside therein and configured to provide a request when one of the titles is ordered; and a server coupled to the network and configured to provide a response to a request from one of the boxes ("an ordering box" hereafter), the response including source information identifying a set of the boxes designed to provide respective distributed segments pertaining to the title to the ordering box, wherein, upon receiving the response, the ordering box starts a time-fill program while downloading collectively the distributed segments from the set of the boxes.

One of the objects of the present inventions is to provide a VOD system that distributes computation and bandwidth requirements to client machines so that the VOD system can sustain a substantial growth in its subscribers.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 2B, according to one embodiment, shows a file organized or fragmented into four segments;

FIG. 2C shows a file pertaining to a title comprising four segments, assuming a situation in which a box receives the four distributed segments from four other boxes to support a playback of the title;

FIG. 2D shows a data stream representing a file being decimated into four individual segments;

FIG. 6B shows an exemplary map illustrating how a library of 5000 titles is distributed across N boxes;

FIG. 6C shows example source information as a table including an IP address (e.g., IPAL) for each of the four boxes that are designated to supply segments for an ordered title;

FIG. 6D shows exemplary source information with backup boxes in a table that includes a backup identifier (shown as an IP address) for each of the designated boxes;

FIG. 6E shows one embodiment in which an ordering box is being supported by three designated boxes, from which three respective segments pertaining to an ordered title are respectively provided to the ordering box, wherein the three designated boxes are respectively backed up by three other boxes;

FIG. 6F shows another embodiment in which an ordering box is being supported by three designated boxes, wherein the three designated boxes are respectively backed up by three other boxes that at the same time backup other designated boxes supporting other ordering boxes;

DETAILED DESCRIPTION OF THE INVENTION

Figure 1:
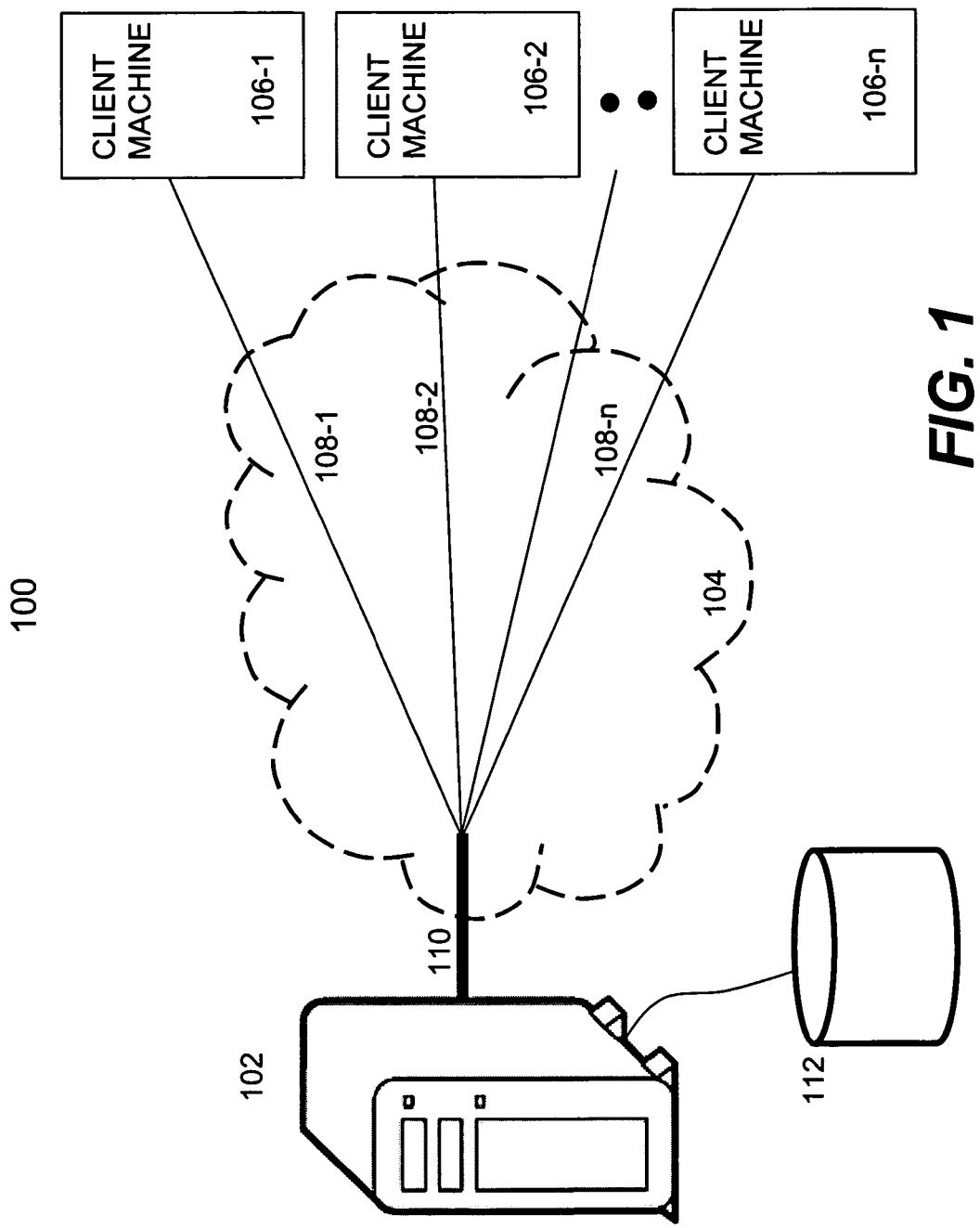
FIG. 1 shows a video delivery system that is commonly used for delivering video services over a network, also referred to as a server-and-client architecture.

The invention relate to various techniques for providing media services over data networks. Some of the techniques, when properly combined, provide efficient Video-ON-Demand (VOD) that includes services, systems and methods for the same. According to one aspect of the present invention, a VOD system is provided on a distributed network and utilizes individual devices on a network to supply each other with needed sources in pieces to render required services. As a result, the loading pressure on the central server or centralized servers is distributed into the network. According to another aspect of the present invention, a file pertaining to a title is fragmented into several tails or segments. None or at least one of the segments are distributed in each of the client machines or boxes in service. When a title is ordered from a box, the segments, if not locally available, are streamed in or continuously fetched respectively from a set of boxes that collectively have the segments. Data from the segments being concurrently fetched in is multiplexed together with data from segments cached locally, if any, to facilitate the playback of the title. Other possible features, benefits and advantages of the invention will become apparent from the following detailed description taken in conjunction with the accompanying drawings which illustrate, by way of example, the principles of the invention.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

For convenience, definitions for some terms are provided below. It should be noted that the definitions are to facilitate the understanding and description of the present invention according to one embodiment. The definitions may appear to include limitations with respect to the embodiment. However, the actual meaning of the terms may have applicability beyond such embodiment.

Media or video—used interchangeably herein, indicates multimedia data, a collection of which with other possible auxiliary data is referred to as a file. Because such a file is typically large in size, it is often compressed for storage or transmission in accordance with a commonly used standard (e.g., H.264, MPEG-1, MPEG-2, or MPEG-4). Examples of a video may include, but are not limited to, movies, games, footage, a collection of documentary or multimedia data.

Local device, computer, machine or, simply, box—used interchangeably herein, is a computing device typically used by a user to access a media file. Such a client machine may operate independently or with another device. Examples of the client machine include a set-top box, a portable device, a computing device, a television with network capability and a network storage device.

Residing segments and distributed segments are relative terms. When a file is divided into several pieces or segments, some of the segments may be distributed remotely in other boxes. These distributed segments are referred to as "distributed objects." Other segments cached locally are referred to as "residing objects" or "resident objects."

Server, server device, server computer, or server machine—used interchangeably herein, is a computing device, typically located remotely from local boxes. Depending on implementation, a server herein may mean a stand-alone computer or a cluster of two or more computers configured to deliver the server operations described herein.

Embodiments of the present invention are discussed herein with reference to FIGS. 2A-8. However, those skilled in the art will readily appreciate that the detailed description given herein with respect to these figures is for explanatory purposes only as the invention extends beyond these limited embodiments.

Figure 2A:
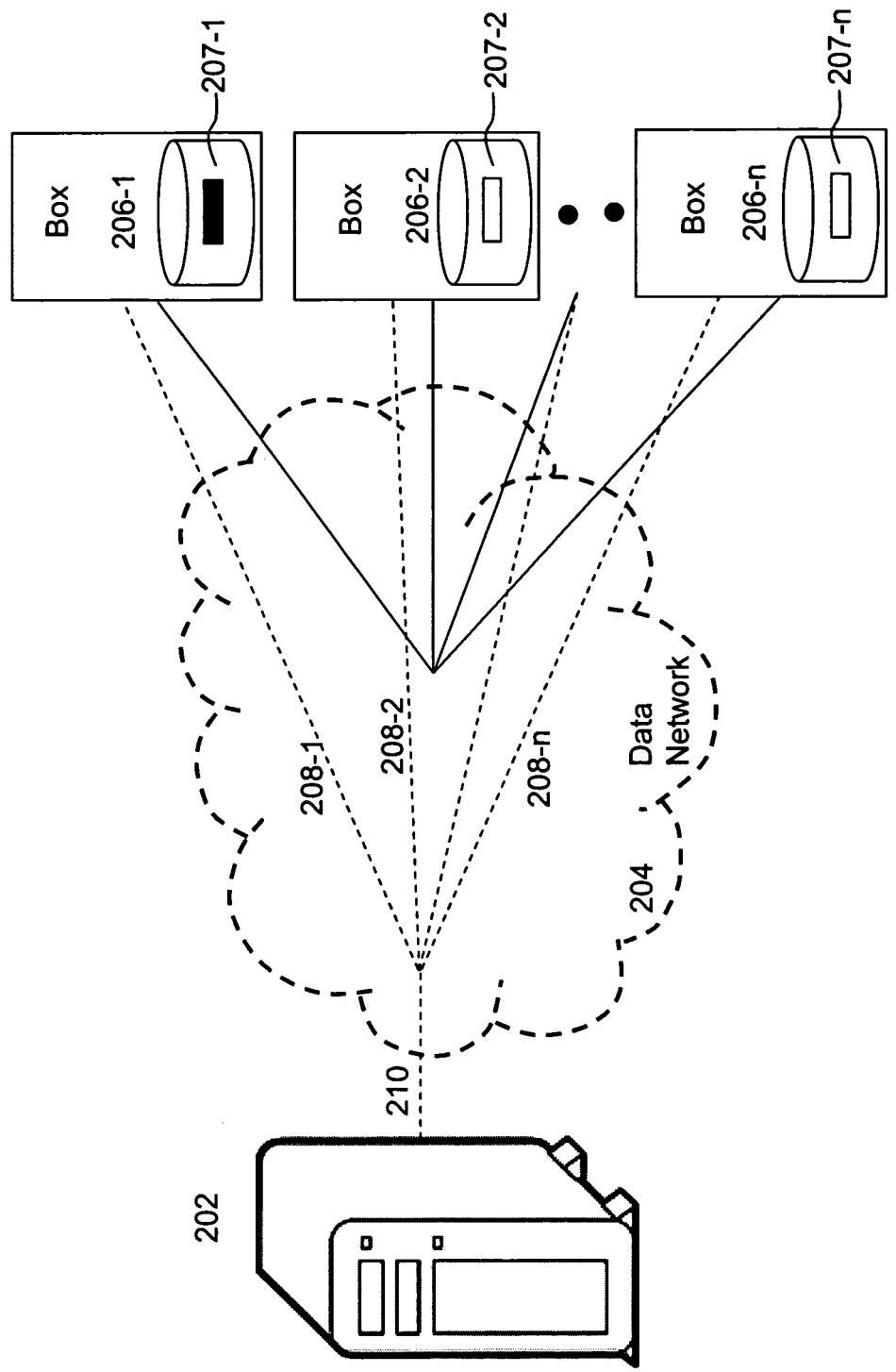
FIG. 2A shows a configuration of a distributed network system, in accordance with an embodiment of the present invention.

One embodiment of the present invention is related to a technique for delivering video services over a data network that is not adversely affected by a growing number of users. In one embodiment, the more users there are, the better the performance delivered by the system or process. FIG. 2A shows an exemplary configuration 200 in accordance with an embodiment of the present invention. A server 202, presumably managed and/or populated by a service provider, is configured to handle the delivery of video (or multimedia) services to users via local machines or boxes 206-1, 206-2, ... 206-n. Different from the video server 102 of FIG. 1 that delivers video data to a subscriber upon receiving a request therefrom, the server 202 is not responsible for delivering the content in response to a request from a user, and instead is configured to provide source information as to where and how to retrieve at least some of the content from other boxes. In other words, the server 102 of FIG. 1 requires the media storage device 112 to provide the content when any of the client machines 106-1,106-2, . . . 106-n is being serviced, while the server 202 does not need a media storage device to provide the content. Instead, the boxes 206-1, 206-2, . . . 206-n are respectively configured to supply part or all of the content to each other.

According to one embodiment, when fulfilling a request from a local machine or an ordering box (e.g., 206-1), communication between the server 202 and the box 206-1 over the network paths 208-1 and 210 may be limited to small-scale requests and responses (e.g., small in data size and short in time). In operation, a response by the server 202 to a request from a box may include source information (e.g., identifiers), authorization information and security information. Using the response from the server 202, the box may be activated to begin initiating one or more requests to other boxes (e.g., 206-2 and 206-n) in accordance with the source identifiers. According to one embodiment, the process of the box initiating requests to other boxes may also be aided by the server first contacting these other boxes directly.

As will be further described below, a file pertaining to a title is fragmented into several segments. Depending on the popularity of the title, none or at least one of the segments are distributed in some or all of the boxes in service. To playback an ordered title successfully, those remotely distributed segments must be retrieved and assembled with any local residing segments if any. Assuming proper authorization, the requesting box (e.g., 206-1) starts to receive the distributed segments concurrently from the other boxes (e.g., 206-2 and 206-n). Because data communications now happen respectively between each of the other boxes and the ordering box, the bandwidth requirement for the communication between the ordering box and the server over the network paths 208-1 and 210 is kept low and typically short in duration. In the event there are a large number of boxes issuing playback requests substantially at the same time, the bandwidth of the backbone path 210 can be still sufficient to avoid noticeable or burdensome delay.

The contents available in a library offered in any of the boxes 206-1, 206-2, . . . 206-n are originally provided by one or more content providers. Examples of the content providers include satellite receivers, television relay stations, analog or digital broadcasting station, movie studios and Internet sites. Depending on implementation, the contents may be initially received or originated in the server 202. Instead of maintaining and managing the contents in a large storage device in a centralized location, the server 202 is configured to distribute the contents or files in pieces to all local machines registered with the server 202. The boxes 206-1, 206-2, . . . 206-n shown in FIG. 2A are examples of local machines in service and are configured to supply each other the distributed parts pertaining to an order.

Unless there is a special need to keep a complete copy of an extremely high-demand title in a box, none of the boxes in service has a complete copy of the data pertaining to a title until an order is placed. Consequently, with embedded security in the distributed objects or segments, the present invention may alleviate the concern of electronic piracy and widespread distribution of multimedia content in electronic form (e.g., by hacking or illegal duplication). Depending on the popularity and concurrent demand for a particular title, the number of residing segments may be increased or decreased to control the dependency of each box on other boxes for playback. Typically, the more residing segments for a title a box has, the more distributed copies of the title there are in the network or the system and thus the less dependency of an ordering box on other boxes.

To facilitate the description of the invention, it is assumed herein that a file pertaining to a title is played, accessed, executed or fed into a display application when the title is selected and ordered by a user. When an order for a title is placed via a box associated with the user, data from the corresponding file must be sequentially available for playback. One of the significant features, benefits and advantages in the present invention is that such a file, regardless of its size, is not completely stored locally. Requiring all files to be locally stored in advance for access, the prior art systems (e.g., Personal Video Record or PVR) offer very limited titles because it is economically infeasible to have a local storage device with an enormous capacity for a substantial number of titles. According to one embodiment, each file is of size 840 Mbytes on average, the present invention offers a VOD library of 5000 titles for access at any time from a box with a storage capacity of 300 Gbytes. If the files for the titles must be stored in advance in the prior art system, the local storage of a box would have at least a capacity of 4,000 Gbytes, which is not acceptable economically in current standard.

Referring to FIG. 2B, there shows an embodiment in which a file 220 is being organized or fragmented in terms of four segments 224. In general, the file 220 may be divided into any number of segments in consideration of a required transmission rate (e.g., related to the encoding and decoding rates for successful playback), and the minimum uploading and downloading capabilities of a network. According to one embodiment, given a required transmission rate (e.g., 1 megabit per second or 1 Mbps), the minimum uploading and downloading speeds of a network are considered to determine a number that defines the segmentation, and thus the dependency on other boxes and the support for concurrent demands of a particular title.

It is assumed that a minimum uploading speed is U and a required transmission rate is D, and D/U=K<k, where k is the smallest integer greater than K. In one embodiment, a file is preferably divided into k segments to optimally utilize the uploading speed of U, assuming that the downloading speed is at least k times faster than the uploading speed. For example, in a POTS-based DSL network for residential areas, the required transmission is about 1.0 Mbps while the uploading speed is about 320 kbps. Hence, k=4. As shown in FIG. 2C, a file 230 comprises four segments 234-237 that are distributed in more than one other boxes, wherein the ordering box 239 depends on four other boxes to supply the four segments 234-237. Assuming that the ordering box 239 has a downloading speed four times the uploading speed of the other boxes, the four segments can be downloaded concurrently across the network 238 as streaming into the ordering box 239 around the same time.

FIG. 2D shows a data stream 240 representing a file. The file 240 is divided into four "vertical" segments 247-250 in reference to FIG. 2B. The segments 247-250 are created or formed by respectively sampling the file in a decimated manner. As a result, each of the segments includes a plurality of data blocks. Depending on an exact data length of the file 240, an n-th data block in each of the segments 247-250 is four successive data blocks in the file. In one embodiment, a data block comprises a chunk of data, for example, 256 Kbytes or 1 Mbyte. As shown in FIG. 2D, the data stream 240 is expressed in data blocks as follows: b11, b21, b31, b41, b12, b22, b32, b42, b13, b23, b33, b43, . . . b1n, b2n, b3n, b4n. With the decimated sampling, the four segments 247-250 obtained can be respectively expressed as follows:

Segment 1={b11, b12, b13, b14 . . . };
Segment 2={b21, b22, b23, b24 . . . };
Segment 3={b31, b32, b33, b34 . . . }; and
Segment 4={b41, b42, b43, b44 . . . }.

FIG. 2D shows one exemplary embodiment of fragmenting a file into four segments 247-250. There can be other ways to fragment a file. For example, besides fragmenting a file into several "vertical" segments representing a file, one or more segments may be allocated to represent audio portions of the file. Typically, a movie includes several audio tracks, each for a language (e.g., English, French or Spanish). As a result, all segments are not necessarily equal in length but need to be available progressively at substantially similar time to support the playback of a selected title. This particular example illustrates that not all segments for a title must be fetched to play back the title (e.g., all segments for the video data and only one segment for one selected audio track). In general, different files may be fragmented into different numbers of segments.

Figure 2E:
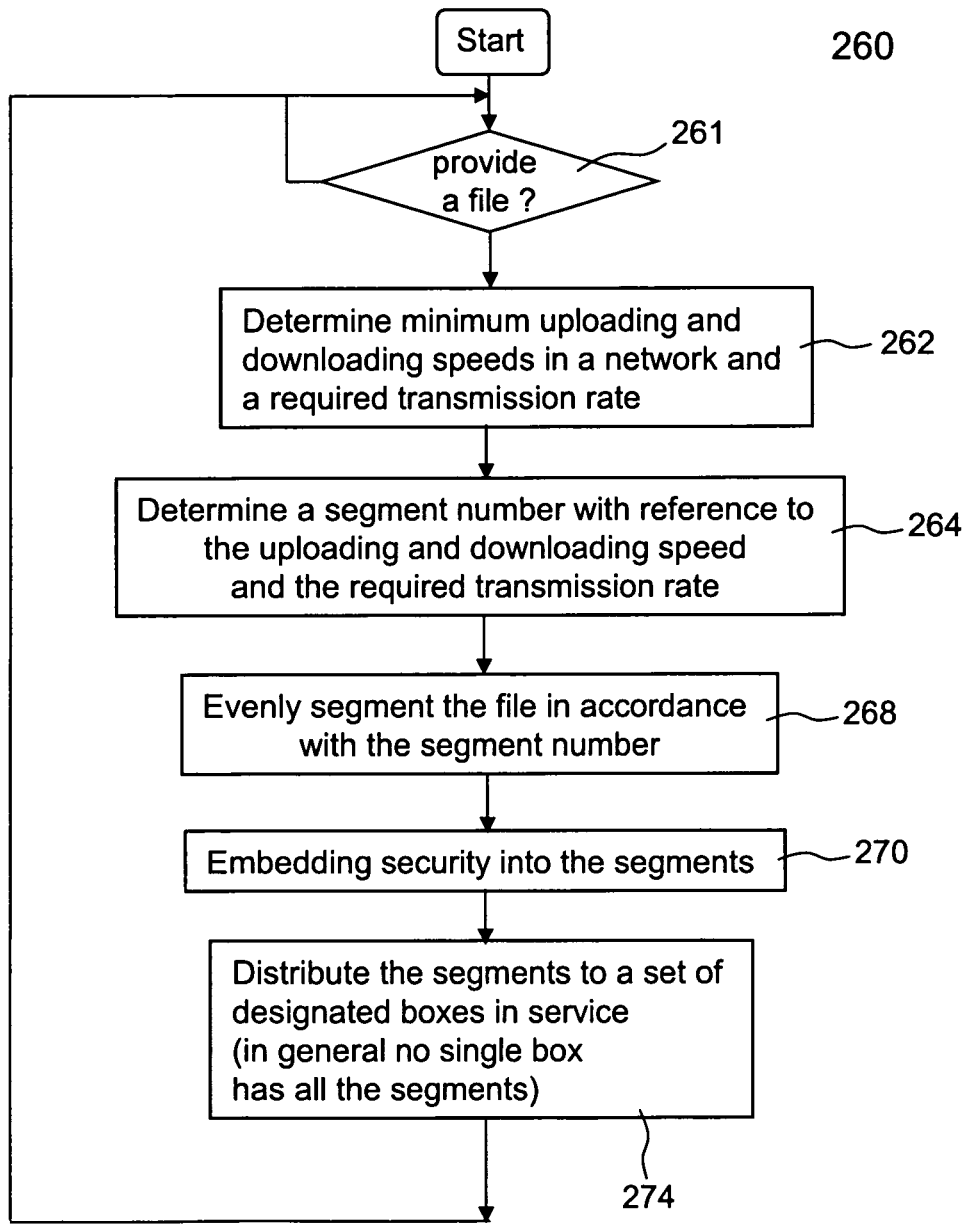
FIG. 2E shows a flowchart or process of, in accordance with one embodiment, fragmenting a file for distribution to a plurality of boxes.

FIG. 2E shows a flowchart or process 260 of fragmenting a file for distribution to a plurality of boxes. The process 260 may be implemented as a method, a process, and/or a system, or in software, hardware or a combination of both. At 261, the process 260 awaits a file to be fragmented for distribution to boxes. When such a file becomes available, at 262, minimum uploading and downloading speeds for a network as well as a required transmission rate are obtained. In general, different networks could have different speeds. Although it is not required to have the network uploading and downloading speeds to dictate a number of segments for the file, the knowledge of such speeds in view of the required transmission rate of the file enables the file to be fragmented to make efficient use of the network speeds (or bandwidths).

At 264, the number of segments k for a file is determined with reference to a number of factors including the minimum uploading and downloading speeds obtained from 262 and a required transmission rate of data for proper display (e.g., 1 Mbit per second). In one embodiment, the actual number of segments is chosen slightly greater than k, for example k+1, provided the downloading bandwidth is sufficient (greater than the required transmission data rate). The extra segment, as will be further described below, may provide extra time to stabilize or overcome network or box instabilities.

Not shown in FIG. 2E is an option to secure the file in its entirety. In one embodiment, the file is scrambled in accordance with an encryption scheme or by a cipher to protect the content therein. Regardless of whether the file is encrypted or clear, it can be fragmented as is. As 268, the file is decimated into k segments. If the file was not secured, at 270, a certain type of security may be embedded into the segments. Depending on implementation, the segments may be respectively encrypted in accordance with an encryption scheme or a cipher (e.g., Data Encryption Standard algorithm, Blowfish block cipher, Twofish cipher and RC-4, AES) and/or protected by digital rights management (DRM).

At 274, none or at least one of segments (e.g., in respective packages) are distributed to all boxes in service. According to one embodiment of the present invention, the distribution is performed synchronously or asynchronously by propagating the respective packages as chunks of data from boxes to boxes, the details of which are described below. After 274, the process 260 goes back to 261 for another file.

One embodiment may enable a dynamically updated library with a large number of titles offered to users. Given a large library, for example, of 5000 titles that are updated periodically (e.g., daily or at a predefined time) and can be accessed anytime, some of the titles may be more popular and thus demanded more often and by more users than others. To minimize possible bandwidth problems or unavailability of boxes for sourcing popular titles, the seeding of residing segments and distributed segments is performed intelligently, e.g., according to popularity, geography, demographics, and/or like criteria.

Figure 3A:
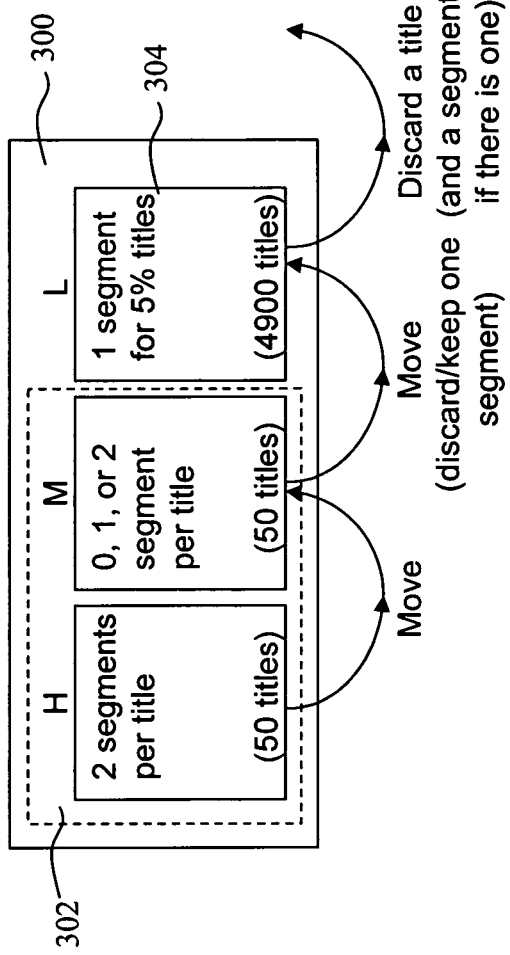
FIG. 3A shows one exemplary popularity classification of titles in a library within a limited storage space in a box.

FIG. 3A shows one exemplary popularity classification of titles in a library in a limited storage space 300 in a box. The library is conceptually divided into two bands, a top band 302 for those newly released or more popular titles and a low (L) band 304 for those relatively less popular titles but still demanded from time to time (e.g., "007: James Bond" or Disney movies for minors). If a library has 5000 titles, the top band 302 may be allocated to accommodate 100 titles, and the low band 304 may be allocated to accommodate the remaining 4900 titles. As new titles are released and added into the top band, the titles already in the top band 302 are either discarded or moved to the lower band 304.

Each movie on average is assumed to be about two hours. For display quality acceptable to most users, a file for a two-hour movie is assumed around 840 Mbytes in size. If a movie file is to be fragmented into four segments, each of the four segments, assuming the file size is close to the average, is therefore about 210 Mbytes. Thus based on the following calculation:

top band 302: 100 titles×2 segments×210 Mbytes=42 Gbytes; and lower band 304: 4900 titles×5%×1 segment×210 Mbytes=51.45 Gbytes);

where it is assumed that there are two segments for each of the titles in the top band and only one segment for each of a percentage (5%) of the titles in the low band. Thus the storage space 300 having a capacity of 100 Gbytes will be sufficient to accommodate the 5000 titles for a distribution as shown in FIG. 3A.

In another embodiment, the top band may further be divided into two bands, a high (H) band for the latest, for example, 50 titles and a medium (M) band for the next 50 slightly older titles. The allocation of an M band facilitates flexible management of the titles in the top band, which is also shown in FIG. 3A. As will be further described below, the number of segments for titles in the M band may be reduced or only a percentage of the titles in the M band may be cached with one or more segments, so as to allocate more resources to update the titles in the H band quickly or reduce the dependency of the titles in the H band on other boxes.

In this embodiment, there are 50, 50 and 4900 titles, respectively, in the H, M, and L bands. In general, when a box has been in service long enough, each title in the top band 302 is seeded with one or two corresponding segments. As far as the number of segments per each title in the L band is concerned, only a percentage of the titles therein are seeded with one segment per each title, and those titles are typically different from one box to another box in a range. Because the demand for a title in the top band 302 is much higher than those in the L band 304, the percentage of segments in a box for titles in the L band may be set at a relatively small number, for example, 5%. The distribution of the segments for the titles in the L band is made in such a way that there is always at least one distributed copy of these titles in the system while there are more distributed copies for the titles in the top band. From another perspective, if a title in the top band 302 is selected, there are more boxes that may be designated to supply the distributed segments to support the playback of the title in the ordering box, thus reducing the possibility that other boxes would be unavailable to supply the missing segments. If a title in the low band is selected, because of the relatively low popularity, it is likely that there will be sufficient distributed copies available in the network so that other boxes can be designated to supply the respective segments for playback.

In operation according to one embodiment, when a title in the H band is selected in a box, two of its segments already reside in the box. Thus, only two other boxes are needed to feed the two missing segments (i.e., dependency=2). When a title in the L band is selected, in many cases, four other boxes are needed to feed the four segments (i.e., dependency=4). In other words, the popularity of a title determines the dependency of an ordering box on others. The more popular a title is, the less dependent the ordering box is on others.

As described above, a library is updated periodically (e.g., daily or weekly). Every time, a new title is received, the new title is typically added into the H band. In one embodiment, it is desirable to maintain a relatively fixed number of titles in the H, M and L bands, the relatively least popular title in the H band is moved to the M band while the oldest title or relatively least popular title in the M band is moved to the L band. On the other hand, it is possible, although rare, that a title in the L band or the M band is promoted to a higher band. Whenever a title is retired from the M band to the L band, the oldest or relatively least popular title in the L band may be discarded. In accordance with FIG. 3A, whenever a title is moved from the top band 302 to the L band 304, one or both segments from the top band 302 may be dropped depending on whether the title falls in the percentage that is designated to maintain one segment.

In general, there is more than one title released in a day to update a library. However, not all of the titles are necessarily new titles (i.e., for the top band), some being very popular and others being less popular. For example, a library may be updated with ten titles in a day, one newly released title in the top band and nine relatively less popular titles in the L band. When the title is added to the top band, two corresponding segments are also added, and at the same time, a relatively old title from the top band (e.g., likely from the M band) may be discarded or moved to the L band. The relatively old title from the M band may be combined with the nine titles to be determined whether any of these ten titles fall into the percentage (e.g., 5%) for which one segment is supposed to be cached locally for a particular box.

To facilitate the description of the distribution of segments, the four segments are labeled respectively as 1, 2, 3 and 4. For titles in the top band 302, there are two segments distributed locally and two segments distributed in other two boxes. As a result, there are six possible combinations of locally stored segments: (segment 1, segment 2), (segment 1, segment 3), (segment 1, segment 4), (segment 2, segment 3), (segment 2, segment 4), (segment 3, segment 4). These combinations are distributed fairly evenly among the boxes in service. If an ordering box has segment 1 and segment 2, a first other box and a second other box need to be called upon to provide segment 3 and segment 4, respectively, to the ordering box. Any box that has either segment 3 or segment 4 may be the first or the second other box. For example, a box with (segment 1, segment 3) and another box with (segment 1, segment 4) may be the first and second other boxes, respectively.

In one embodiment, boxes are classified into types. For example, there are six types of boxes, each designated for storage of one of the six combinations provided above. If there are 50 titles in the H band, the segments for each of the 50 titles are distributed according to one of the six combinations. For titles in the L band, each box stores one segment of 5% of the titles. When one of the titles in the L band is ordered, that box may or may not have a segment cached locally. Accordingly, the distribution of the segments for the titles in the L band must ensure that boxes in service collectively have all segments for all the titles. In other words, there must be at least one distributed copy in the network of each title in the L band.

There are a number of ways to distribute the segments for titles in the L band among the boxes in service. According to one embodiment, to facilitate the management of the distribution of the segments for the titles in the L band, the distribution of segments for titles in the H band is referenced. For example, when segment 1 and segment 2 for a title in the H band are stored locally, either segment 1 or segment 2 for a title in the L band will be stored locally (since the box need only discard one of the segments when retiring a title from the top band to the low band). Accordingly, the following management of the distribution holds:

| Store locally for a title in the L band | If segments for titles in the H band are |
| --- | --- |
| segment 1 or 2 | segment 1 and 2 |
| segment 1 or 3 | segment 1 and 3 |
| segment 1 or 4 | segment 1 and 4 |
| segment 2 or 3 | segment 2 and 3 |
| segment 2 or 4 | segment 2 and 4 |
| segment 3 or 4 | segment 3 and 4 |

The determination of which titles in the L band fall into the selected percentage for a particular box may be determined based on a number of factors. In one embodiment, the percentage is determined as a potentially randomized function of the ages or popularity of the titles. In another embodiment, the percentage is determined based on statistics of viewing behavior and a preferred language in an area or other measures that may facilitate the retrieval of distributed objects from other boxes more efficiently. In still another embodiment, the percentage is determined from a learning engine that may be embedded in a box dynamically recording some or all of the following exemplary list:
1. the set of programs (e.g., movies) a user has been watching so far from the box;
2. the programs that user has rated (e.g., on a scale of 1 to 10) on the box;
3. the programs on a wish list created by the user for future watching; and
4. browsing activities (e.g., trailers the user has watched and the time the user has spent on reading a brief introduction for a title).

The learning engine may be activated to provide statistics to suggest which programs, e.g., movies are similar to the ones the user has watched (e.g., with respect to actors, directors, or genres). Accordingly, these movies are chosen to be among the percentage of the titles to have the corresponding segments. In addition, the determination of which pairs of movies are similar may be made based on what is referred to as "collaborative filtering", namely, if many users like to watch a pair of movies, then the two movies may be considered similar. Thus, additional movies similar to those likely selected and ordered in the box may be added to the percentage of titles as well. In any case, a box may cache segments pertaining to titles that are more likely going to be selected and ordered by a user via the box. In another embodiment, each movie may be defined by certain attributes. User behavior may suggest user preferences of certain attributes. By matching preferred attributes to movie attributes, the learning engine may determine which segments for 1 band titles to store in each box. Also, comparisons can be made between like but different users. For example, if a first user prefers action-based movies and has previously ordered movies X, Y and Z and if a second user prefers action-based movies, the learning engine may opt to store segments for movies X, Y and Z on the second user's box.

Figure 3B:
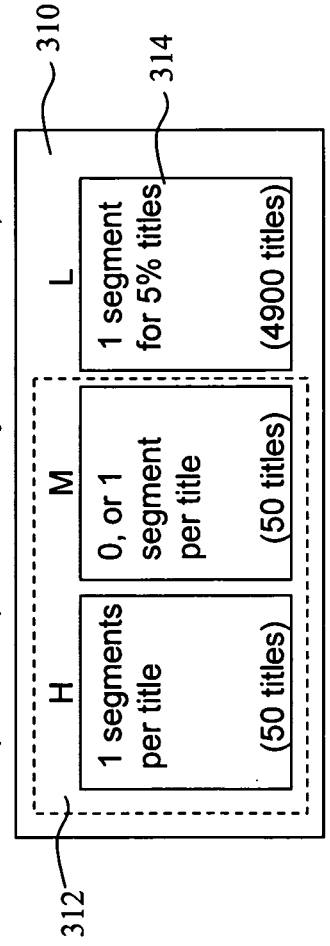
FIG. 3B shows another exemplary popularity classification of titles in a library within a limited storage space in a box.

FIG. 3B shows another exemplary popularity classification of titles in a library within a limited storage space 310 in a box. One of the major differences between FIG. 3A and FIG. 3B is that the top band 302 in FIG. 3A retains two segments for each title therein while the top band 310 in FIG. 3B retains one segment for each title therein.

In addition to FIG. 3A or FIG. 3B, according to one embodiment, all boxes in service may be configured to include more than two segments for one or more titles in the H band, essentially increasing the number of distributed copies of those highly demanded titles. When a title is newly released or statistically determined popular, the boxes in service can be activated to increase the number of segments for these titles so that dependency of an ordering box on others is significantly reduced. [Do we have a description where High band has only 1 segment? This is the most likely scheme we will use.]

To further minimize storage requirement on a box, the top band or the H band may require only one segment for each of the titles in the band. In one embodiment, a title, regardless of its popularity, may be provided with more segments than other titles in the library. For example, when a user desires to establish his/her own movie library or acquire a movie, a title in the library may be accessed repeatedly. According to one embodiment, after a certain type of payment or arrangement with a service provider, the box associated with the user retains more or all segments for the title. As a result, the title can be accessed repeatedly at any time. Depending on implementation, such a title may or may not be subject to the library updating as further detailed below, and the data thereof can not be automatically deleted unless the user authorizes so.

Figures 3C, 3D:
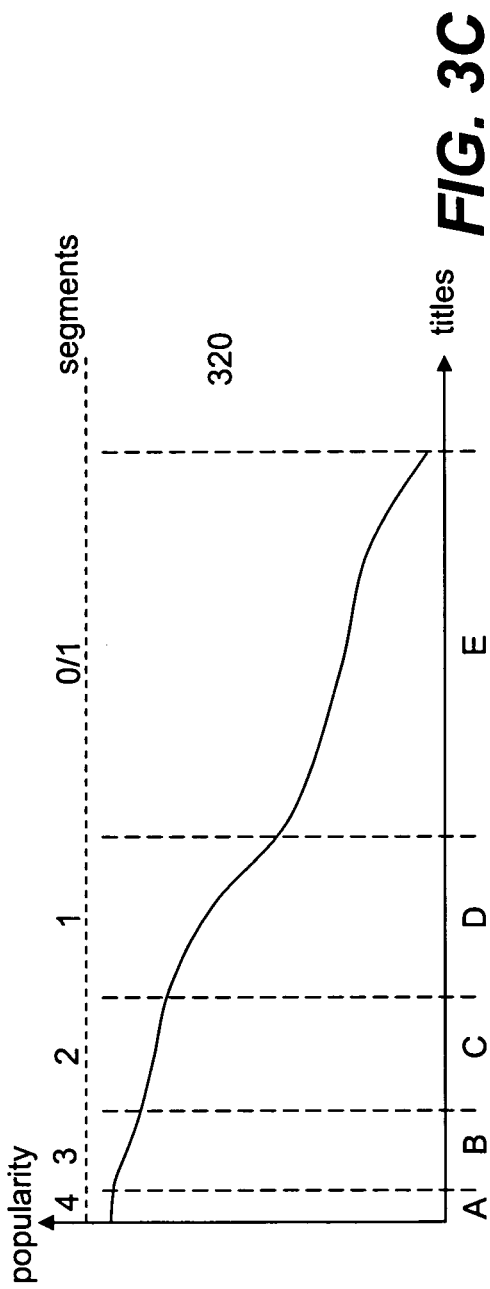
FIG. 3C shows an exemplary banding scheme in accordance with the popularity of the titles in a library.
FIG. 3D shows corresponding dependency of each title in a band for a continuous playback in accordance with a banding shown in FIG. 3C.

FIG. 3C shows another exemplary banding scheme in accordance with the popularity of the titles in a library. The banding scheme divides titles in a library into multiple bands (e.g., 5 bands). The curve 320 shows A, B, C, D and E bands with the A band representing the most popular titles and the E band representing the relatively least popular titles in the library. The titles available in each of the bands may be updated periodically according to one or more measurements from, for example, demand statistics, geographic locations, a preferred language, age of the title, demographic information, or the like. Accordingly, each box stores all of the corresponding segments for titles in the A band (e.g., one or two newly released titles), three segments locally for titles in the B band, two segments locally for titles in the C band, one segment locally for titles in the D band, one segment locally for a small percentage, say 5%, of titles in the E band. As a result, the dependency of each title in a band for a continuous playback as listed in a table 326 shown in FIG. 3D is 0, 1, 2, 3 and possibly 4, respectively.

For completeness, the table 326 also includes a column 328 showing exemplary statistics of demands for titles in each of the bands, namely, the demands for the titles in the band A are expected to be about 60% of the overall requests for the library. The declining demand for titles in bands B, C, D and E are illustrated as 20%, 10%, 8% and 2%. Although there may be a huge demand for a title in band A, the dependency of the ordering box on other boxes for a title in band A is zero. Therefore, orders for titles in band A can be locally fulfilled.

On the other hand, the demand for titles in bands B, C, D and E progressively decreases. Accordingly, the dependency of an ordering box in bands B, C, D and E progressively increases. Distributed copies of titles in the bands B, C, D and E progressively decrease.

The banding scheme described above with reference to FIGS. 3C and 3D may be extended logically to any number of bands for a specified number of segments in accordance with the popularity of the title. For example, a band B' may be placed between bands B and C in the previous example, with each box storing an average of 2.5 segments per title in the band. One way to create and control such an average number of segments would let half the boxes store 2 segments and half the nodes store three. In an extreme case, each title would not only have a different number of segments, but each box may also independently determine how many segments to cache locally for each title. In general, the more popular a title is, the more segments there will be locally cached and the more distributed copies there will be available in the network. In any case, when a title in a library has no segment locally cached, there must be at least one copy of all corresponding segments in the network. Otherwise, an order for such a title could not be rendered.

Figure 3E:
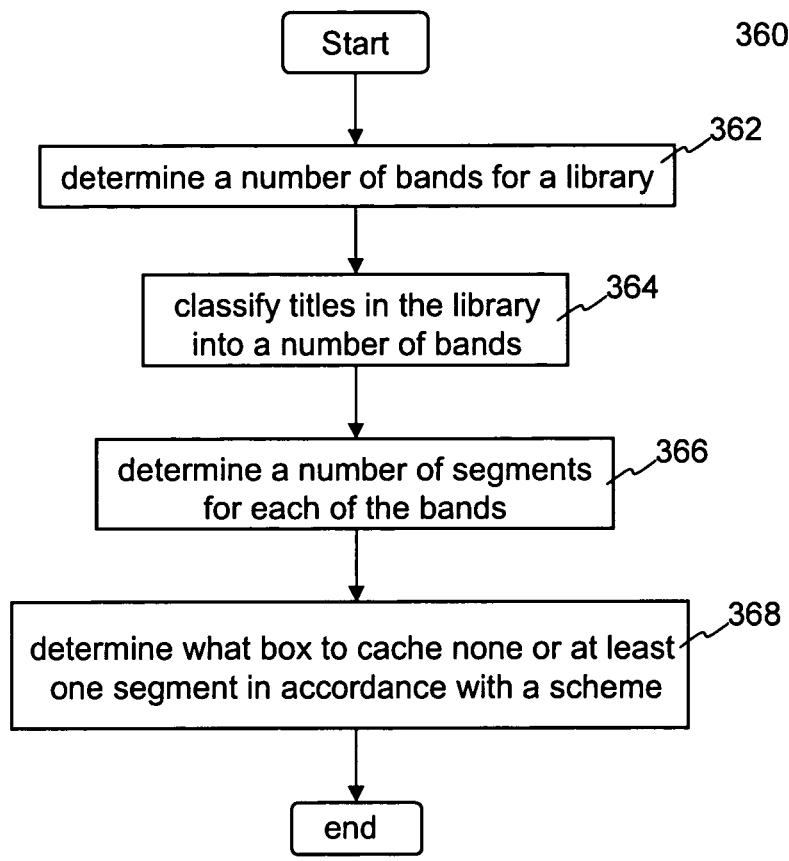
FIG. 3E shows a flowchart or process of classifying a library of many titles for instant access according to one embodiment.

FIG. 3E shows a flowchart or process 360 of classifying a library of titles for access. The process 360 may be implemented in software, hardware or a combination of both as a method, a process, and/or a system. When the process 360 is employed in a VOD system, a file pertaining to a title may be fragmented in accordance with the process 260 of FIG. 2E into one or more segments. At 362, it is necessary to determine how files pertaining to the titles should be distributed, thereby defining the number of titles stored in each library. In general, the number of titles available in a library is a function of a number of factors that include the capacity of a storage space in boxes, network speeds, demand, file size, required data transmission speeds, concurrency support, etc. In one embodiment, it is determined that 5000 titles may be offered in a library, each lasting for two hours on average and comprising 840 Mbytes-1 Gbyte in size. The process 260 of FIG. 2E may be used to determine fragmentation of the files. Once the number of the bands is determined, the process 360 goes to 364.

At 364, the titles are classified into bands. At least, two bands are used, a top band for the most popular titles (e.g., new releases) and a low band for relatively less popular titles. Depending on implementation, one or more intermediate bands may be introduced to store titles that neither fit in the top band nor the low band and to facilitate updating a library. As described above, there will be more distributed copies of titles in the top band than those in other bands to accommodate concurrent orders. In operation, the number of titles in the top band is preferably kept small to optimize the use of the storage space in a box.

At 366, the number of segments for each band is determined. According to one embodiment, more segments for a title in the top band are locally cached, which translates to more distributed copies available in the network. As a result, for a more popular title, an ordering box depends less on other boxes to supply the segments needed for continuous playback of the title. On the other hand, only a percentage of titles in the low band are locally cached, which translates to fewer distributed copies available in the network. If the system is configured to include intermediate bands, the number of segments to be locally cached may decrease progressively from the top band.

At 368, the process 360 determines the boxes in which to cache segments. Depending on implementation, a segment distribution scheme may be based on different factors to optimize segment caching for efficient storage and effective sourcing of titles. In one embodiment, the distribution of segments is determined based on viewing behaviors. By examining the viewing behaviors of users, it may be determined statistically which box is more likely to order a particular title. For example, users who frequently order action movies are more likely to order another action movie. When distributing segments pertaining to titles for action movies, the distribution may be orchestrated to ensure that these segments end up in boxes that are statistically more likely to order action movies. In another embodiment, distribution may be based on preferred languages. The distribution of segments pertaining to titles in a preferred language, e.g., Spanish, may be made so that such segments end up in boxes associated with boxes statistically more likely to order movies in the preferred language.

Figure 3F:
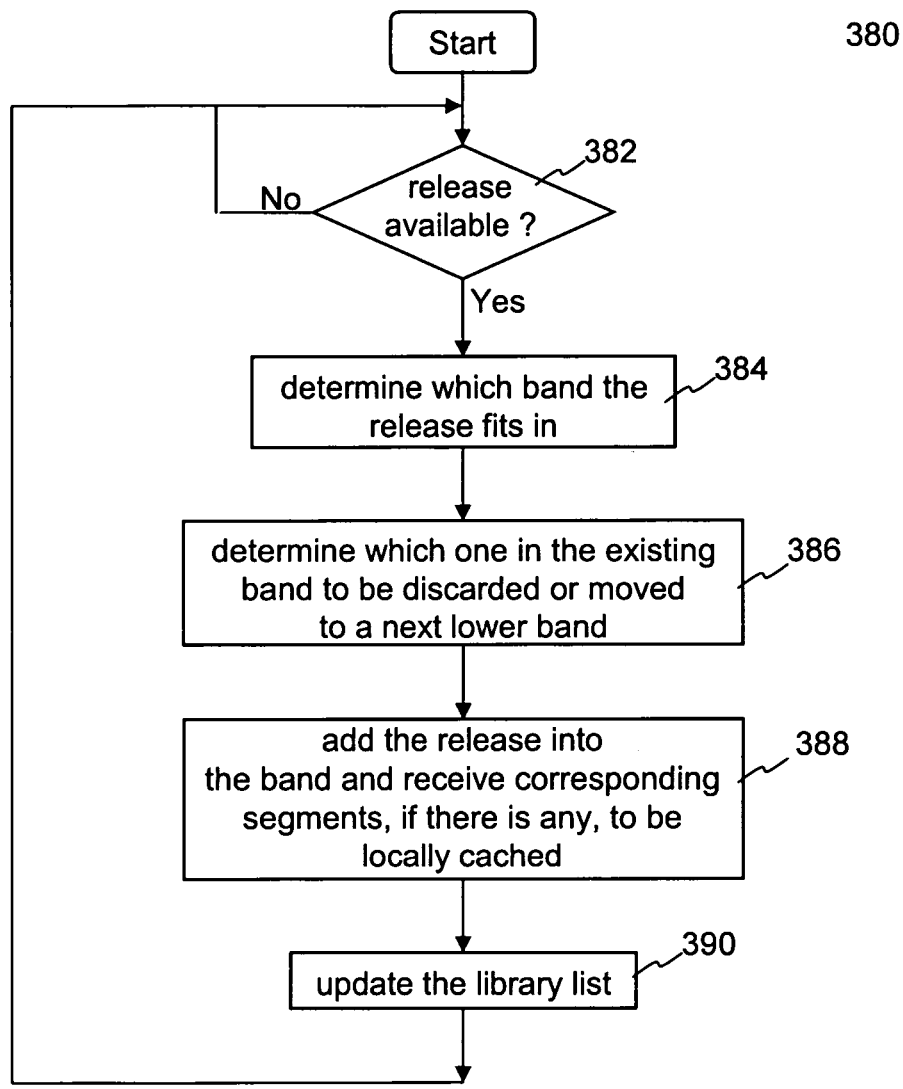
FIG. 3F shows a flowchart or process of updating a library in a box according to one embodiment.

FIG. 3F shows a flowchart or process 380 of updating a library in a box. The process 380 may be implemented in software, hardware or a combination of both, and as a method, a process, and/or a system. When the process 380 is employed in a VOD system, a large file pertaining to a title may be fragmented in accordance with the process 260 of FIG. 2E into several segments. A library in each box is updated periodically or at a predetermined time. The process 380 may be used to dynamically update the library so that all boxes in service are synchronized in terms of the titles available.

At 382, the process 380 awaits a release. As will be further described below, a release (comprising one or more titles) may be provided directly from a server (e.g., the server 202 of FIG. 2A) or propagated from other boxes. Each title in the release is fragmented into a number of segments (e.g., by the process 260 of FIG. 2E). For a title that has been fragmented into four segments, there are six different release packages that boxes may desire (for those titles that require two segments): (segment 1, segment 2), (segment 1, segment 3), (segment 1, segment 4), (segment 2, segment 3), (segment 2, segment 4), and (segment 3, segment 4). At least one of these release packages will be received in a box.

In one embodiment, upon receiving a message that a release is available or data set from either the server or a box, the process 380 begins. At 384, in accordance with the release package, an appropriate band for each title in the release is determined. As described above, the title may pertain to any type (e.g., a high band or a low band). Therefore an appropriate band to accommodate the title is determined. To avoid exceeding a predefined number of titles in a band, an existing but relatively least popular title in the band is preferably retired from the band. At 386, such relatively least popular title in the band is determined. In one embodiment, a received message pertaining to the release indicates which existing title in which band is to be discarded or moved to a lower band. At 388, the title is added into the allocated band by receiving in the box the corresponding segments (which may be none) pertaining to the title.

At 390, a library list in the box is updated. Depending on implementation, the library list may be updated locally by removing the retired title and adding the new title, or an updated library list may be received. As a result, the retired title is no longer available but the new title is now available for order.

Figure 4A:
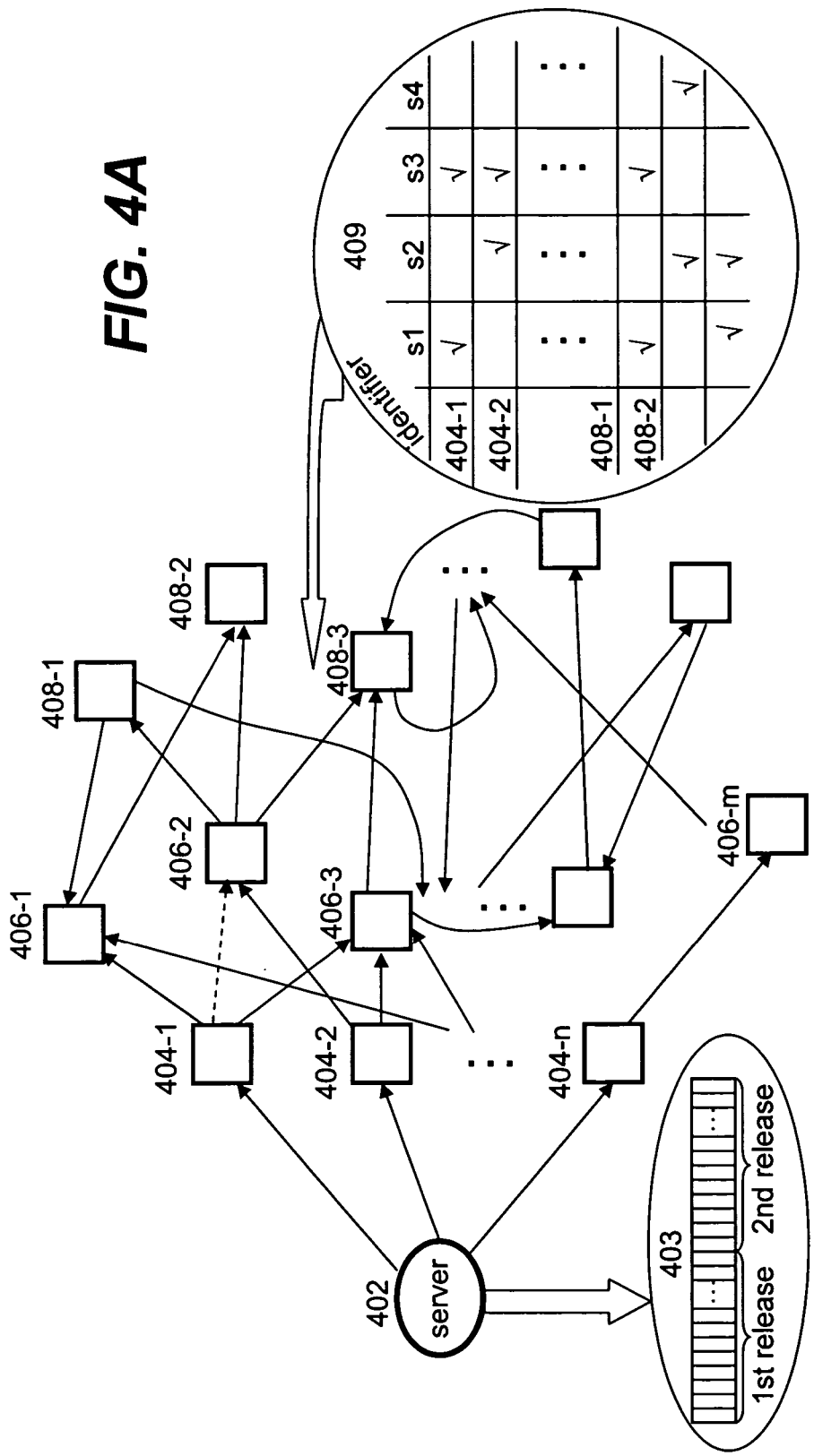
FIG. 4A shows a diagram of updating, synchronously or asynchronously, a library in all boxes in service according to one embodiment.

Referring now to FIG. 4A, there shows a diagram 400 of updating a library of all boxes in service. When a server (e.g., the server 202 of FIG. 2A) updates the library, the library in all the boxes is updated accordingly. In one embodiment, the updating process is carried synchronously and/or asynchronously.

The server 402 is configured to prepare a file pertaining to the release of a title into segments. One exemplary method to prepare the file is the process 260 of FIG. 2E. For convenience, it is assumed that there are four data segments pertaining to a title. Accordingly, as described above, depending on which band the release is to be put in, there may be a plurality of release packages. In operation, each of the boxes in service is configured to receive one release package.

Initially, the server prepares a release instruction including metadata about a release, a least popular title to be discarded from the library and/or title transfers. The instruction may describe which box gets which of the release packages and how (the package is to be received (i.e., from which other boxes). For example, the instruction could specify that boxes identified by identifiers that demonstrate certain characteristics are to receive a release package X. There may be a default instruction that applies in general to all releases, and there may be instructions tailored to specific releases as well. One of the objectives of assigning release packages to boxes may be to distribute the packages fairly evenly among all boxes in service to ensure uniform distribution of different segments.

The release instruction, once prepared by the server, is propagated to boxes in service either via direct communication between the server and a box, or by box-to-box propagation of the instruction via what is referred to as a gossip protocol, which will be described in detail below. In any case, it is assumed that each box recognizes the need for it to receive a particular release package.

The release is transformed into a sequence of data chunks 403 representing the segments for the release. A data chunk is an atomic unit of data transfer from the server to the boxes, or between two boxes. For example, each of the data chunks may be 1 Mbyte in size and uniquely identified. The sequence of data chunks 403 may represent two or more separate titles being propagated to the boxes to update the library. In general, each box desires a specific subset of the data chunks that make up a proper release package corresponding to that box. In addition, the release instruction itself may be represented as one or more data chunks that are to be propagated to all boxes.

In operation, the server 402 initiates respective communications with a set of boxes 404-1, 404-2, . . . 404-n and provides each of them with some of the data chunks required by that box. Preferably, each data chunk is seeded into at least one of the boxes by the server 402. The exact number of the boxes 404-1, 404-2, . . . 404-n initially to receive the data chunks does not constrain distribution. In one embodiment, the designation of the boxes 404-1, 404-2, . . . 404-n is fairly random. In another embodiment, the designation of the boxes 404-1, 404-2, . . . 404-n is based on one or more of a time zone, the geographical location, an available network bandwidth, and the latency thereof, the Internet service provider for the box, etc. In any case, whenever the server 402 is idle, the server 402 can always designate different boxes to receive data chunks.

Each of the boxes 404-1, 404-2, . . . 404-n is configured to spread data chunks to other boxes in service based on what is commonly referred to as a "gossip protocol," an application-layer multicast-like protocol. It should be noted that not all of the boxes 404-1, 404-2, . . . and 404-n have received identical data chunks. Any of the boxes 404-1, 404-2, . . . and 404-n may start to spread a data chunk to other boxes as soon as it has received a data chunk in its entirety. In operation, the box 404-1 is assigned to propagate at least some of its received data chunks to boxes 406-1, 406-2 and 406-3, communicating with one or more of these boxes simultaneously. The box 404-2 is assigned to propagate at least some of its received data chunks to boxes 406-2 and 406-3. The box 406-2 is configured to know exactly what data chunks to get from the box 404-1, the box 404-2, and any other boxes configured to feed it chunks of data. Further, the box 406-2 is assigned to propagate at least some of its received data chunks to boxes 408-1, 408-2 and 408-3. Note that the propagation of data is not necessarily hierarchical. For example, box 408-1 might send data chunks "backward" to 406-1, as seen in the figure.

In one embodiment, data chunks are propagated only to boxes that actually desire those particular chunks in order to avoid wasteful data transmission. Moreover, wasteful data transmissions may be avoided by ensuring that a data chunk is propagated to a box only if it does not already possess that chunk and is not in the process of downloading that chunk from elsewhere. The propagation of chunks may be through synchronous protocols where all boxes participate at the same time in a coordinated fashion, or asynchronous protocols in which each box may choose when to participate and for how long in a flexible manner. For example, a box could cease participating in the downloading and propagation of chunks whenever it is needed to serve a movie for an ordering box, or when the network is detected to be in a period of intense usage. The box may continuously monitor the network conditions, and adaptively rejoin the gossiping propagation when the bandwidth in the network becomes sufficient.

In operation, if any one of the boxes, for whatever reason, fails to accept data chunks, the box could be dropped as a supplier or a substitute box could be configured to receive and supply the data chunk. The box that missed the release may fetch the data later from one or more updated boxes. By repeatedly and recursively propagating data chunks via boxes after boxes (i.e., by pulling or pushing synchronously and/or asynchronously), eventually all boxes in service will be populated with each release (the designated segments of all titles to be added and the identification of titles to be removed).

After updating is finished, a map 409 identifying which box has which segments can be developed. By the map 409, whenever an order is received from an ordering box, the server can designate appropriate boxes to supply the non-locally cached segments to the ordering box. Alternatively, the map 409 enables a box to obtain source information to fetch needed segments to fulfill an order.

When the release is not for the top band, the determination of which box to retain what segment(s) may be based on several factors such as geographic locations, time zone, viewing behaviors or a preferred language so as to maximize the efficiency of transporting the segments among the boxes when needed. According to one embodiment, it should be appreciated that deletion of titles from a list of available titles may be distributed to the boxes first. That way, no box is available for ordering a title that is to be retired. Distributing title deletion instructions may be implemented using the gossip protocol discussed above or may be provided by direct box-to-server communication.

Figure 4B:
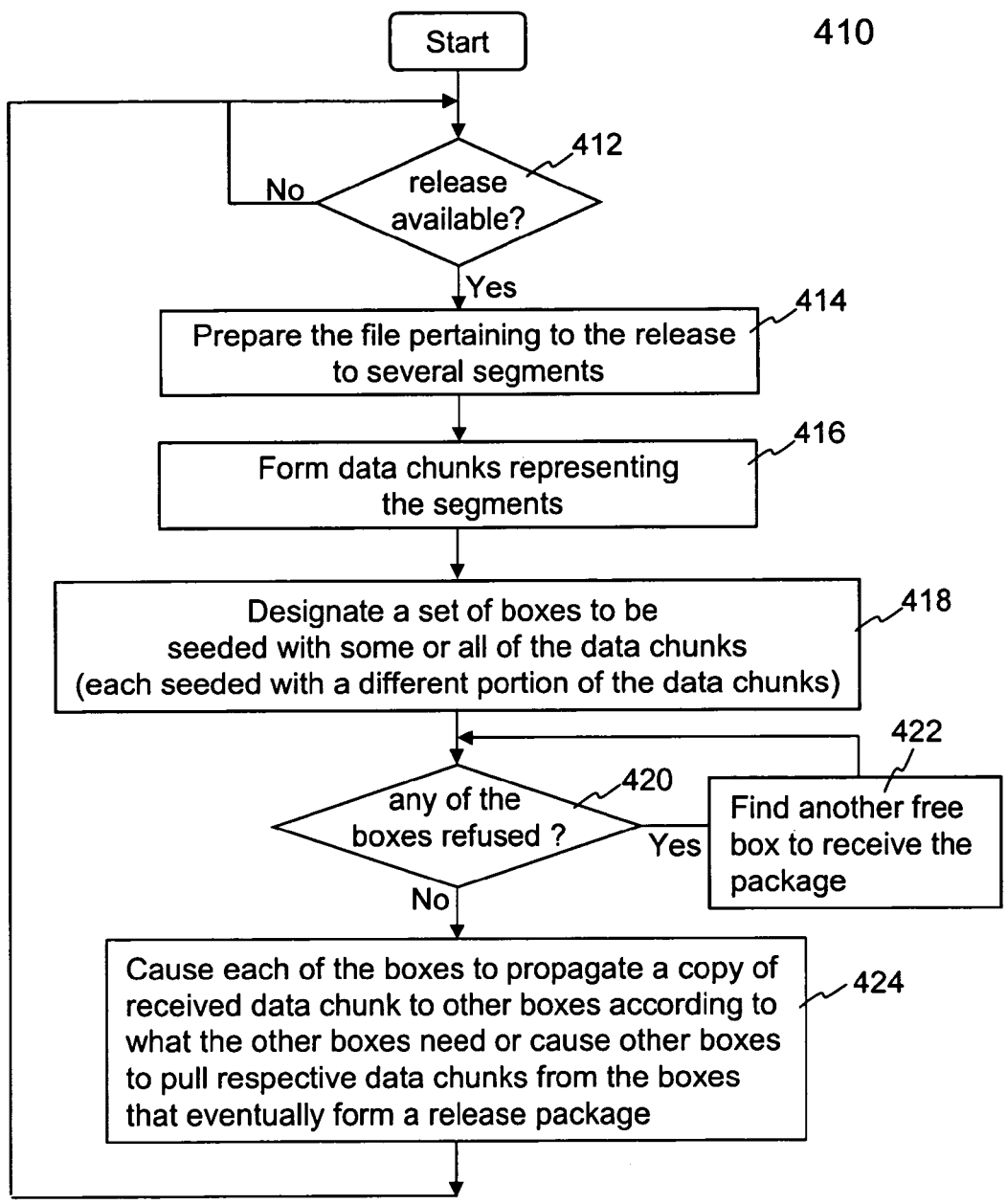
FIG. 4B shows a flowchart or process of seeding a release in boxes in service according to one embodiment.

Referring now to FIG. 4B, there shows a flowchart or process 410 of seeding a release to boxes in service. The process 410 may be implemented in software, hardware or a combination of both. The process 410 is particularly useful to update a directory that is maintained in multiple locations without using a centralized server. One of the possible features, advantages and benefits of the process 410 is that the directory in the multiple locations is updated synchronously and/or asynchronously by propagating an update in data chunks via locations by locations by an application-layer multicast-like gossip protocol. When the process 410 is employed in a VOD system, a library with many titles may be updated dynamically or efficiently without requiring high bandwidth to support simultaneous updating.

At 412, the process awaits a release that may become available at a device (e.g., a server by a service provider) on the data network. When the release becomes available, the files pertaining to the release are prepared in a server at 414 for distribution to the boxes. The process 260 of FIG. 2E may be an exemplary process for fragmentation into a set of corresponding segments for each of the files.

At 416, a release including segments is divided into chunks of data. At 418, the server designates an initial set of boxes to receive at least some of the data chunks. In one embodiment, the boxes may not receive identical data chunks. Depending on implementation, the server may push respective sets of data chunks to the initial boxes or the initial boxes may pull respective set of data chunks from the server. In some embodiments, a copy of all data chunks is distributed to the initial boxes so that the initial boxes may seed the other boxes in the system without further involving the server.

At 420, the process 410 determines whether any one of the boxes were unable to receive any of the data chunks. If there is a box that does not receive the data chunks, the process goes to 422 where a box that does not belong to the initial set replaces the failing one. As a result, at least one complete set of data chunks may be initially distributed synchronously or asynchronously among the set of seeding boxes.

The process 410 then moves to 424, where each of the seeding boxes is configured to spread at least some of the received data chunks to one or more other boxes (e.g., another set of boxes physically nearby), each of which is configured to further spread at least some of its received data chunks to other boxes. It should be noted that any box may at the same time communicate with more than one box to collectively fetch data chunks. The process 410 then returns to 412 awaiting any other release.

In operation, the process 410 is not limited to updating a library one title at a time. By transforming titles into data chunks, more than one title may be spread into the system by propagating the data chunks from boxes to boxes asynchronously. Also the process 410 does not have to end before another title can be distributed. Before one release has been completely seeded in the boxes in service, another release may be made available for distribution. In operation, the process 410 is preferably started when network traffic is low, such as at midnight. Typically, the process 410 may take hours to finish.

Figure 4D:
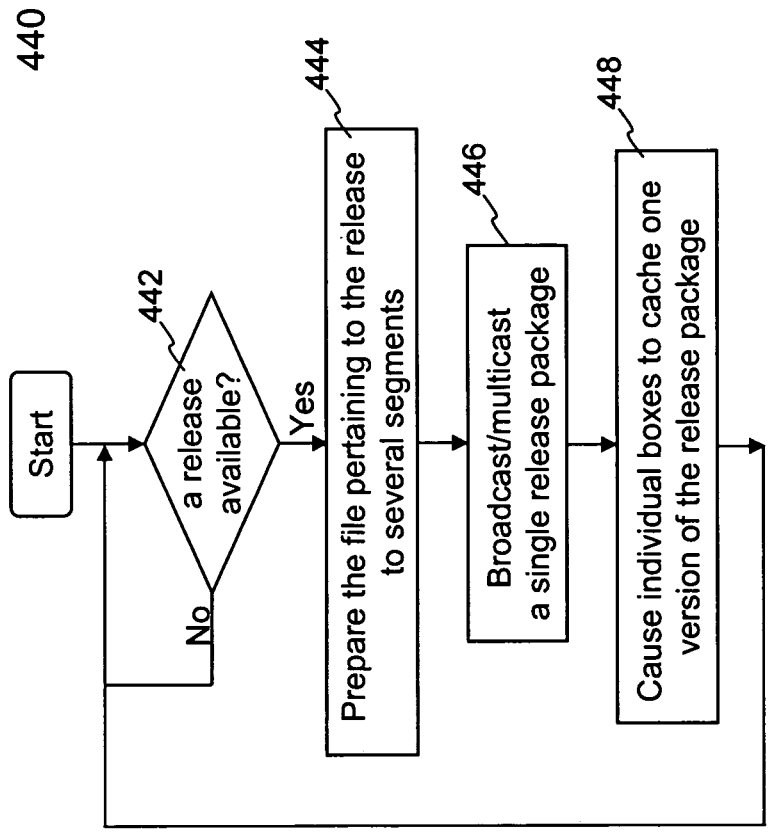
FIG. 4D shows a exemplary flowchart or process of seeding a release in boxes in service for a configuration in which the bandwidth for broadcasting or multicasting is sufficient.

FIG. 4D shows a flowchart or process 440 of seeding a release to boxes in service for a configuration in which a service provider is provided with one or more high-bandwidth channels for broadcasting or multicasting. Such configuration may be found in a cable or satellite infrastructure that enjoys very high speed broadcasting or multicasting capability, or in a data network with multicast support. The process 410, preferably understood in conjunction with FIG. 4C, takes advantages of such infrastructure to update a library in boxes with one or more titles, wherein the boxes are assumed to be equipped with the receiving capability (e.g., tuners) and tuned to appropriate channel(s) for receiving the broadcast(s). Examples of such boxes include a satellite receiving box and a cable set-top box.

Figure 4C:
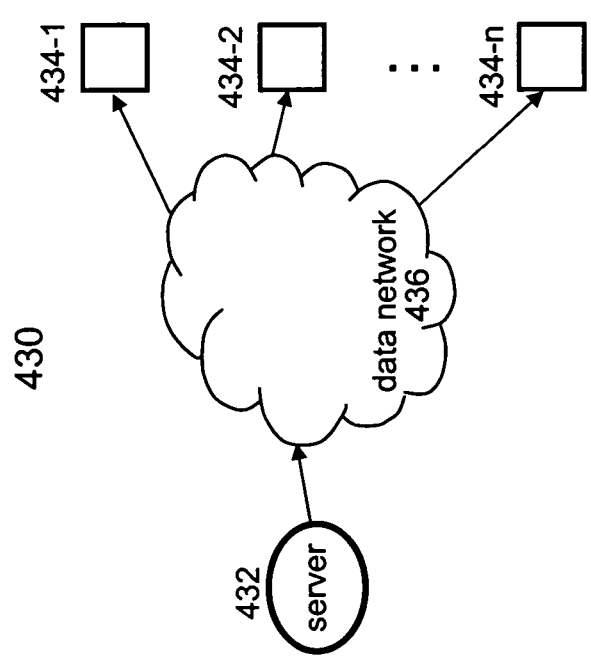
FIG. 4C shows an exemplary situation in which a service provider is provided with an infrastructure of high bandwidth broadcasting capability.

As shown in FIG. 4C, a server 432 is coupled to a network 436 that may be a cable network (i.e., the coaxial cables or fibers as the medium) or a satellite network (i.e., the air as the transmission medium). Similar to the server 402 of FIG. 4A, the server 432 is responsible for distributing a release. At 442, the process 440 awaits a release. The process 440 is activated when a release become available. The titles pertaining to the release is prepared at 444 in the server 432 for distribution to the boxes. The process 260 of FIG. 2E is an exemplary process for fragmentation into corresponding segments for each title.

At 446, a release package including all segments for all titles is broadcast to the network 436 at a predefined time or periodically. In accordance with an instruction that may be received from the server 432 or that may be locally configured, each box captures and caches the data in accordance with its configuration from the release at 448. For example, a box is supposed to receive two segments, the box only captures and caches the two segments.

Since each of the boxes in service chooses appropriate data from the consolidated single release package, the library in each box is updated synchronously. In the event that some boxes are unable to update at the time of broadcast, these boxes can be updated in a next broadcast or asynchronously with other updated boxes using the process 410 of FIG. 4B as described above. In one embodiment, multiple channels in the cable or satellite infrastructure may be utilized to expedite the updating process by broadcasting or multicasting, for example, a respective release package in a specified channel. As described above, in one scenario, there may be six different release packages, each for one type of box. As such, a box may be configured to tune to the specific channel for its release.

Boxes recently placed in service or recently reconnected to a network after a lengthy period of time are collectively referred to herein as new boxes. These new boxes may be empty or include data segments for respective titles available at the time of being packaged for shipment or being unplugged from the network. During the time these new boxes were disconnected from the network, the library in active boxes may have been updated many times. As a result, the original library in the new boxes is outdated.

Figure 5A:
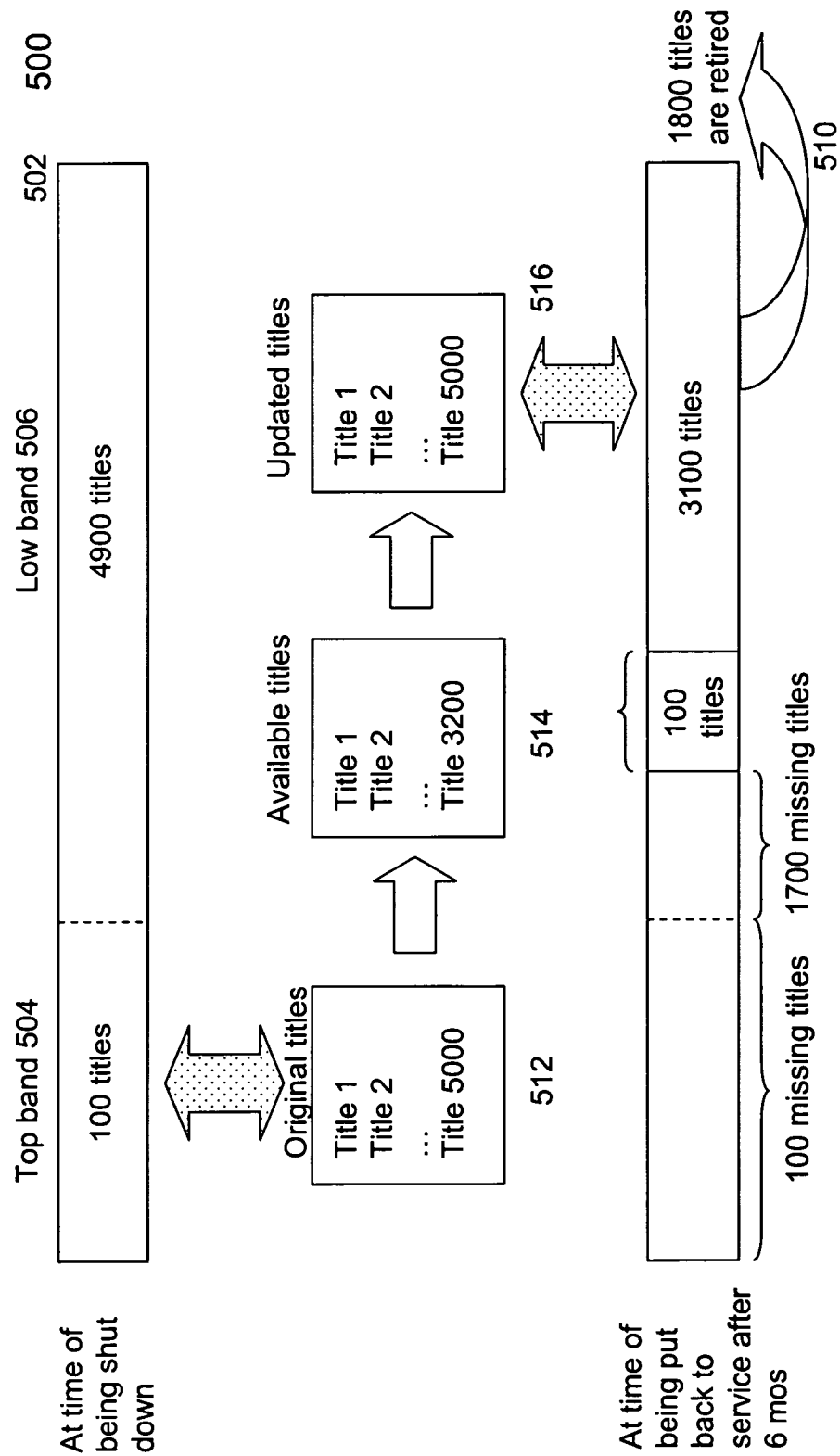
FIG. 5A shows, according to one embodiment, how a library in a new box provides services while being updated.

It is assumed that a service provider updates a library with ten releases each day and the total number of titles in the library is 5000. If the idle time is ten days, the original library has missed one hundred releases. If the idle time is about six months (e.g., 180 days), the original library in the boxes would be outdated by 1800 releases. FIG. 5A shows a library 500 in a new box. At the time of becoming a new box (e.g., being unplugged or just copied with the library before shipment), the box has a library of 5000 titles shown as 512 and is assumed to include 100 titles in the top band 504 and 4900 titles in the low band 506. The library 500, if accessed, would show that there are 5000 titles available for selection and ordering. However, because since the box has been out of service for 180 days, the library 500 has missed 1800 releases, 100 of which may be the releases that should have been in the top band 504 and 1700 of which are releases in the low band 506.

Accordingly, at the time the new box is put back in service, before being updated with the server, the library 500 has in fact 3200 valid titles for selection and ordering shown as 514. After the new box communicates with the server, the list of the library is updated. Now the library in the new box has 5000 titles shown as 516. It should be noted that the list of the library in the new box is updated, the library itself has yet to be updated. In other words, there are no any segments for any of the 1800 titles that have been missed in the past 180 days. As a result, an order of any one of the 1800 titles will fully depend on other boxes to collectively supply all the segments pertaining to the title.

According to one embodiment, a new box begins the library updates whenever possible, for example, when the box is not servicing an order. There are a number of ways to update the library so that the new box is subsequently updated with an updated library as shown 510 of FIG. 5A. For example, a first corresponding segment for each of the 100 titles in the top band 504 is retrieved first, a segment for each of some of the titles in the low band 506 is then retrieved. Alternatively, corresponding segments for each of the 100 titles in the top band 504 are retrieved first, a segment for each of some of the titles in the low band 506 is then retrieved. In any case, the new box being updated may be designated to supply one or more segments (newly retrieved or originally cached) to other ordering boxes.

Figure 5B:
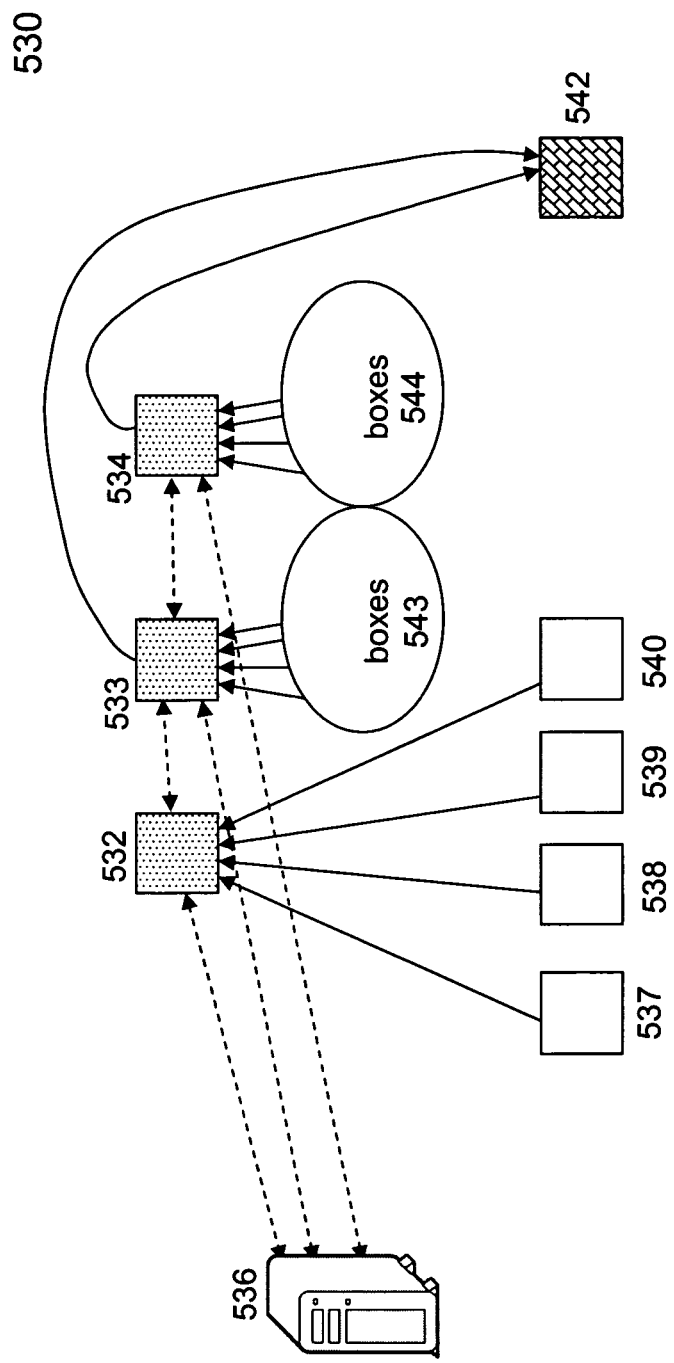
FIG. 5B shows an exemplary situation in which three new boxes are added into the system.

FIG. 5B shows a situation 530 in which three boxes 532-534 have just been added into the system. After the three boxes 532-534 have registered respectively with a server 536 with their respective identifiers and/or IP addresses and library statuses, the server 536 returns with information on what these boxes have missed in the past and how to get updated, for example, where to fetch the designated segment (s). The situation 530 shows that the box 532 shall initially fetch the missing segments from a group of boxes 537-540, and the boxes 533 and 534 shall initially fetch the designated segment(s) from a group of boxes 543 and 544, respectively. It is noted that a box (i.e., 532) can be configured to dynamically switch from boxes to boxes to fetch the corresponding segments.

In operation, the three boxes 532-534 can be candidates to start serving others (e.g., for titles in the L band). In FIG. 5B, an ordering box 542 is placing an order for a title in the L band. It is also assumed that the title pertains to a file that has been divided into four segments, two of which reside in the ordering box 542. Therefore the ordering box 542 needs to fetch the other two missing segments. The ordering box 542 may get the missing segments from any two of the boxes 532-534, provided that each of them has one of the two missing segments and not all of them have an identical one of the two missing segments.

Figure 6A:
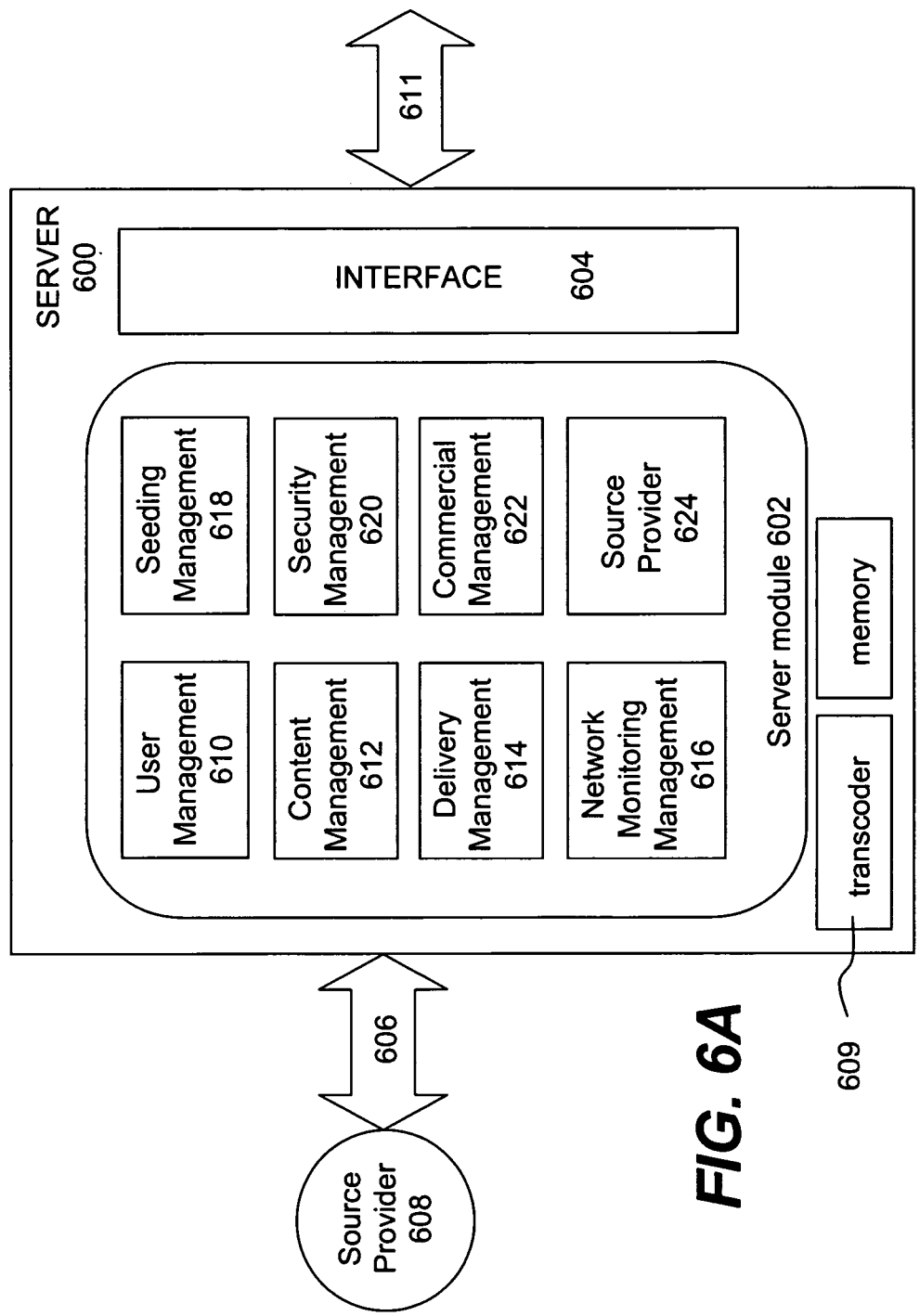
FIG. 6A shows one exemplary implementation of a server according to the present invention.

Referring now to FIG. 6A, there shows one exemplary implementation of a server 600. The server 600 may correspond to the server 202 of FIG. 2A, and may be a single computing device or a cluster of computers. The sever 600 includes a server module 602 and an interface 604. In general, the server module 602 is loaded in a memory and executed by one or more processors (not shown) to perform some or all of operations contemplated in the present invention. In application, the server 600 may be operated by a service provider or an enterprise to provide media services to users.

The server 600 also includes a delivery agent 606 that facilitates communications between a content or source provider 608 and the server 600. Depending on implementation, the source provider 608 may include, but may not be limited to, a content receiver, a content producer, and a movie publisher. The delivery agent 606 is provided to ensure contents are received properly from the source provider 608. Depending on how the content is received, the delivery agent 606 may be implemented in various forms. For example, a movie publisher releases movies to a service provider operating the server 600. The movies may be transported securely to the server 600, in which case the delivery agent 606 is a secure transmission medium. In another example, the content may be transported by satellite, in which case, the delivery agent 606 may be a satellite receiver. In still another example in which a corporation desires to advertise its products or services via the server 600 to a plurality of users, the corporation may deliver a commercial video to the server 600 via the Internet. Accordingly, the delivery agent 606 is part of the Internet or a local network and provides a necessary interface (e.g., TCP/IP) to facilitate data communication between the server 600 and the Internet. To avoid obscuring aspects of the present invention, other examples are not further listed herein.

For efficiency, the server 600 may include or be coupled to a transcoder 609 that is provided to convert source files in various formats into an acceptable format which is operable in the boxes. Typically, a video source provided by a content provider could be high-definition video signals, DVDs, film, etc. If that format is not a desired format for the server 600, the transcoder 609 is activated to convert such source to the acceptable format (e.g., MPEG-2 or MPEG-4). As described above, the source provider 608 may provide many types of sources. With the transcoder 609 or an appropriate device with similar functions, the server 600 can receive any type of sources and distribute them to users for fees or for information.

The server 600 includes another interface 604 that facilitates data communication between the server 600 and a plurality of boxes in service over a data network 611, wherein the server 600 may be located remotely with respect to the boxes. The network 611 can be part of a large network including the Internet, the public switch telephone network (PSTN), a private network, or a wireless network. The network 611 may use one or more different transmission media, such as telephone lines, cables, fibers or air (wireless). An exemplary communication protocol used for communications between the server 600 and the boxes is TCP/IP.

As shown in FIG. 6A, the server module 602 includes a plurality of functional engines or modules that are configured to work cooperatively with each other. Not every module listed in the server module 602 of FIG. 6A must be employed in practice. Depending on actual implementation or needs, the modules may be selectively deployed.

User management module 610 is configured to manage subscribers or users. It facilitates addition, deletion or updating of accounts pertaining to all users subscribing to or desiring to receive media services from the service provider. The user management module 610 also manages payment settlement for all the accounts. In one embodiment, each account is billed for a fixed monthly fee that allows unlimited access to the media service. In another embodiment, each account is updated or charged whenever an order for a title in a library provided by the service provider is placed.

Content management module 612 manages all content that may be provided to the users. As described above, the content is organized in the form of segments. These segments are distributed among the boxes in service. The content management module 612 is configured to manage the distribution of these segments. By accessing the content management module 612, an operator may control directly how to distribute segments related to titles in the library and get mapping information on what is available and how and where these segments are distributed. FIG. 6B shows an exemplary map 630 illustrating how a library of 5000 titles is distributed across N boxes. Column 632 lists all boxes in service. Each box is assigned a unique identifier for identification. Information in the column 632 may be viewed as the identifiers for the boxes in service. For example, box 1 is assigned a unique identifier of "Box 1" or a sequence of alphanumeric characters.

Column 634 lists a corresponding IP address for each of the boxes listed in column 632. Column 636 lists time-fill programs for all titles in the library. A time-fill program, as will be further described below, is used to fill in a time frame in which the distributed segments are being retrieved. Depending on implementation, the time-fill programs may be identical or each of the time-fill programs is self-configured in accordance with what has been ordered. Column 638 lists what segments for title1 are residing in each of the boxes, assuming title1 is required to have two segments cached in each box. Column 640 lists what segment for title2 is residing in each of the boxes, assuming title2 is required to have one segment cached in each of the boxes. Column 642 lists what segment for title5000 is in a selected set of boxes, assuming title5000 is required to have one segment in these selected boxes. As a result, all objects (i.e., segments) in a box may be uniquely addressed for uploading to another box or playback of an ordered title locally.

Delivery management module 614 is configured to respond to an order received from an ordering box. Working with the content management module 612, the delivery management module 614 creates, in responding to the order, a response that includes source information, authentication information and security information. An example of the source information is graphically illustrated as a table 650 in FIG. 6C or a table 652 in FIG. 6D. The table 650 includes an IP address (e.g., IPA1) for each of the four boxes that are designated to supply the segments for an ordered title. The authentication information authenticates the ordering box for secured communications with other boxes. The security information facilitates decryption of any data for playback of the title. The response may further include an IP address identifying the ordering box and instructions as to what segments to retrieve from other boxes. Upon receiving the response, the ordering box initiates four respective requests in accordance with the response received from the server. It is understood that each of the requests includes an IP address of one of the four boxes. When each of the four boxes receives one of the requests, the requested segment is released or uploaded to the ordering box.

Network management module 616 is provided to monitor the status of each of the boxes in service. In one application, the network management module 616 is configured to receive an address of a box. In many cases, a box is assigned a dynamic address by an Internet service provider that may be changed from time to time. To ensure each and every box in service is in contact with the server 600, whenever the IP address of a box is changed for whatever reason, the new IP address thereof must be notified to the server in time. In one embodiment, each of the boxes is configured to send or receive a short message event triggered or periodically to or from the server such that the network management module 616 updates, if necessary, the IP address for the box that has changed its IP address. On the other end, the network management module 616 is configured to send a short message to each of the boxes for a short response. If a box is out of operation (e.g., powered off or malfunctioning), the network management module 616 is thus notified immediately and updates the delivery management module 614 that may exclude the box out of designation for providing segments for an ordering box. Similarly, if a box is already supplying a segment for a movie order, the network management module may keep the delivery management module informed of the box's availability status for supplying a segment for another order.

Seeding management module 618 may also be referred to as a library management module. The seeding management module 618 is responsible for updating the library in each box. Whenever there is a release, the seeding management module 618 ensures proper seeding of the release into the boxes. In a situation in which the release is a newly released movie and likely in high demand, the seeding management module 618 causes at least one of the segments of the file pertaining to the release to reside in each of the boxes. In another situation in which the release is not a newly released movie but may be popular in demand, the seeding management module 618 causes possibly one of the segments of the file pertaining to the release to reside in each of the boxes. In still another situation in which the release is a classic title and relatively less popular in demand, the seeding management module 618 causes a segment to reside in a selected group of the boxes in the network. In yet another situation in which there is a new box just coupled to the network, the network monitoring management 616 is configured to notify the seeding management module 618 of the status of the box. Depending on the status of the existing library in the box, the seeding management module 618 determines what is missing in the library and provides instructions to the box how to update the library from other boxes.

Security management module 620 is provided to secure the objects distributed across the boxes in service. In one embodiment, the security management module 620 is configured to authenticate a user associated with an ordering box and provide one or more security keys and authentication information to the ordering box after the user is authenticated and/or a payment for the order is settled. The security keys, once in an ordering box, may facilitate the decryption of the segments. The authentication information allows the ordering box to communicate with the designated boxes to fetch needed segments for the playback of the title. In another embodiment, the security management module 620 works in conjunction with the content management module 612 or the seeding management module 618 to encrypt all objects (i.e., segments) before they are distributed across the boxes in service. In still another embodiment, the security management module 620 provides digital rights management (DRM) of all contents that are distributed as objects across all boxes in service. In still another embodiment, the security management module 620 may remove small portions from a title's file before it is broken into segments and distributed across boxes. When a box orders a title, these portions of the file are supplied directly by the server, perhaps as part of the server response, improving security by ensuring that the title cannot be fully constructed without the active participation of the server.

Commercial information management module 622 is provided to manage commercial information intended to display to users whenever appropriate. Examples of such information may include, but not be limited to, advertisements, special offers, movie trailers and public broadcasts. Such information may be superimposed onto a small part of a display showing a movie, displayed during intervals between two movies, or beginning of showing a movie, or simply requested by a user. Depending on implementation, such information may be appended to a segment pertaining to a release or distributed independently according to one or more factors that include geographical locations of the boxes, viewing behaviors or preferred languages of the users.

Source provider management module 624 is provided to manage distribution of any fees paid by users for using any distributed contents originated by providers. Depending on implementation, the source provider management module 624 may be configured to share payments with respective content providers on daily, weekly or monthly basis via the delivery agent 606 or provide financial outlook or statistics of titles in the library being offered.

In further reference to the delivery management module 614 in FIG. 6A, according to one embodiment, the delivery management module 614 is configured to prevent a situation in which one or more of designated boxes become suddenly unavailable or slow down to continue the supply of the required segments to an ordering box. The source information in a response to the ordering box includes backup information for each of the designated boxes. FIG. 6D shows exemplary source information with backup boxes in a table 652 that includes a backup identifier (shown as an IP address) for each of the designated boxes. Should one of the boxes fail to respond to the request for a segment from the ordering box or the segment cannot be received correctly, the backup IP address is immediately called upon to switch to the corresponding backup box that is available to provide or continue to provide a segment that the originally designated box fails to provide.

In one embodiment, the delivery management module 614 is configured to automatically contact a backup box in an event that a designated box fails to supply the required segment. The ordering box notifies the delivery management module 614 when the designated box underperforms or fails to deliver the required segment. The delivery management module 614 is configured to determine an appropriate backup box to substitute the originally designated box and cause the backup box to continue supplying the required segment or pick up where the originally designated box has left. In case no appropriate backup box may be allocated for the ordering box, the delivery management module 614 calls on the content management module 612 to continue supplying the required segment or pick up where the originally designated box has left.

For completeness, FIG. 6E shows one embodiment in which an ordering box 654 is being supported by three designated boxes 655-657 to receive three respective segments pertaining to a title being ordered in the box 654. Each of the boxes 655-657 is provided with a backup box that has a corresponding identical segment. Specifically, the box 655 is supported by a backup box 658, the box 656 is supported by a backup box 659, and the box 657 is supported by a backup box 660. If, for some reason, the box 656 refuses to continue providing the segment, the backup box 659 is activated to replace the box 656 to continue providing the segment. In one embodiment, the backup box 659 is configured to join the box 656 to conjointly supply the segment to the box 654 (e.g., each supplying a different portion of the same segment).

FIG. 6F shows another embodiment in which an ordering box 670 is being supported by three designated boxes 671-673 to receive three respective segments pertaining to a title being ordered in the box 670. In operation, the breakdown of an ordering box, for whatever reason it may be, is rare, and the breakdown of several boxes at exactly the same time is even rarer. Therefore the three backup boxes 674-676 for the three designated boxes 671-673 may also be designed as the backup boxes to other designated boxes supplying segments. FIG. 6F shows an ordering box 677 being supplied by two designated boxes 679 and 680 while an ordering box 678 is being supplied by three designated boxes 682-684. To ensure the respective fetching processes are carried out successfully, each of the designated boxes is supported by a backup box, in which case, the two designated boxes 679 and 680 are being backed up by the boxes 674 and 675 and the three designated boxes 682-684 are being backed up by the boxes 674-676. In the event one of the backup boxes 674-676 becoming an active box, the server 600 may immediately designate another box in the field to be the backup box.

Figure 6G:
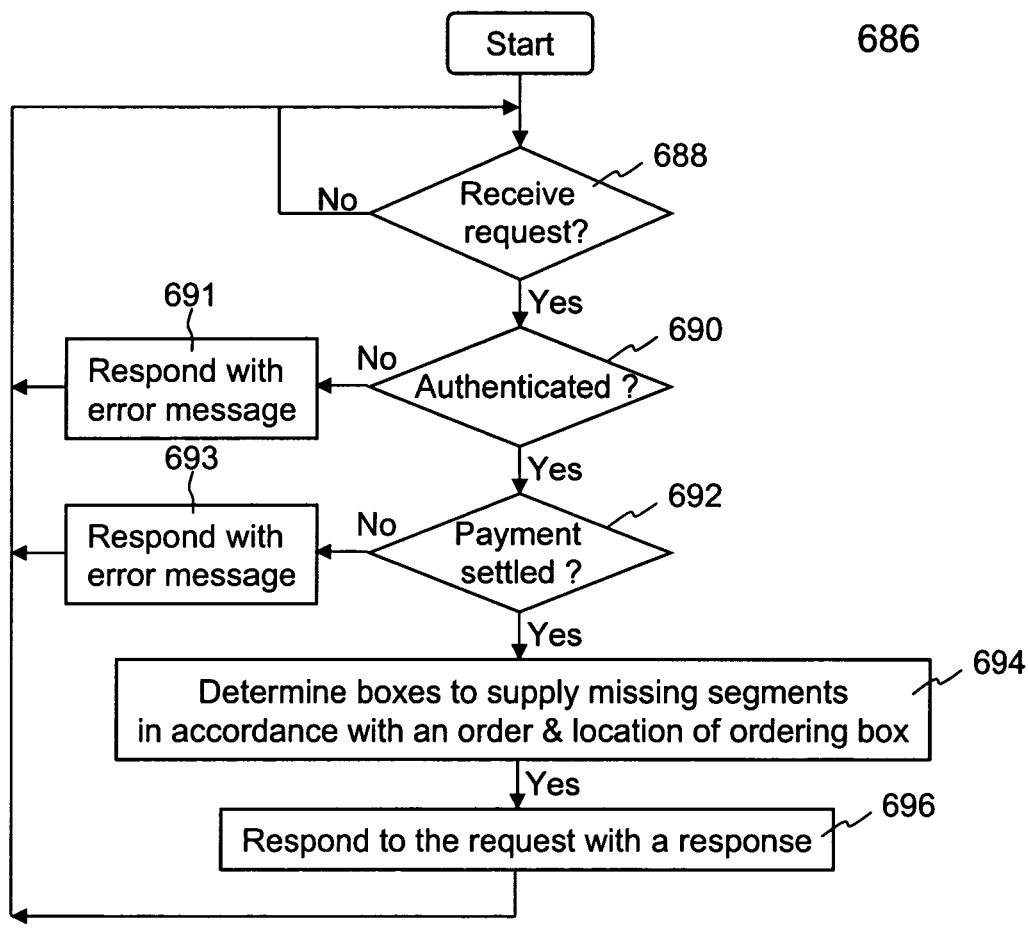
FIG. 6G shows a flowchart or process of starting an instant playback of a selection (i.e., a title) in a library.

Referring now to FIG. 6G, there shows a flowchart or process 686 of starting a playback of a selection (i.e., a title) in a library. The process 686 may be implemented in software, hardware or a combination of both as a method, a process, and/or a system. Preferably, the process 686 is executed in a computing device designated as a server facilitating the instant playback of a selected title from a box associated with a user. In one embodiment, the process 686 is employed in a media on demand system. At 688, the process 686 is awaiting a request from an ordering box associated with a user. Typically, a user selects a title and then places an order. As will be further described below, the ordering box generates a request to be transported to the server. The process 686 is activated when such request including the order is received from the ordering box. In general, the request includes an identifier and an IP address of the ordering box, the user account information (e.g., user name), and the order information. Before anything happens in the ordering box, the process 686 proceeds with authentication of the user. If the user is not registered, the process 686 goes to 691 wherein a response including an error message is generated and returned to the ordering box. Depending on implementation, the error message may activate a local module in the ordering box to display an error message or ask the user to register with the system.

After the user is authenticated, the process 686 goes to 692 to determine if payment for the order is settled. In one embodiment, in a registration process, a user may provide credit card information for charges on any order the user places with the system. In another embodiment, the user may receive a monthly statement for collective settlement of charges. If payment is not settled (e.g., the user has a large outstanding balance in his/her account), the process 686 goes to 693 where a response including an error message is generated and returned to the ordering box. The error message may be displayed locally to the user for payment.

After payment is settled, the process 686 goes to 694 to determine a number of boxes that are designated to supply the segments to the ordering box. The exact number of boxes depends on the number of segments the ordering box needs to continue the playback of the selected title. At 696, a response is generated in accordance with the received request. In general, the response includes source information, authentication information and security information. The source information instructs where and how the ordering box can get the needed segment(s) to continue the playback of the selected title. The authentication information allows the ordering box to conduct respective secured communications with boxes designated to supply the needed segment(s). The security information facilitates decryption of any data for the playback of the ordered title. In determining one or more boxes to supply the needed segments among others, one or more several factors may be considered depending on implementation. These factors include, but may not be limited to, respective available bandwidths, geographic locations, histories of availability of these supplying boxes, and the Internet service provider of each box. In addition, whether the ordered title is popular or not, a supplying box is new or not, and a supplying box is busy or not may be considered as well. In any case, the response is transported back to the ordering box or causes the ordering box to start the playback while receiving the needed segments. The process 686 then returns to 688 to await another request.

The process 686 shows that, in one embodiment, the server handles only the ordering process and thus can easily manage a large number of requests for different titles at substantially the same time. One of the possible features, advantages and benefits of some embodiments of the present invention is to shift the data-feeding burden to the users to use the collective unused bandwidth and computing power.

Figure 7A:
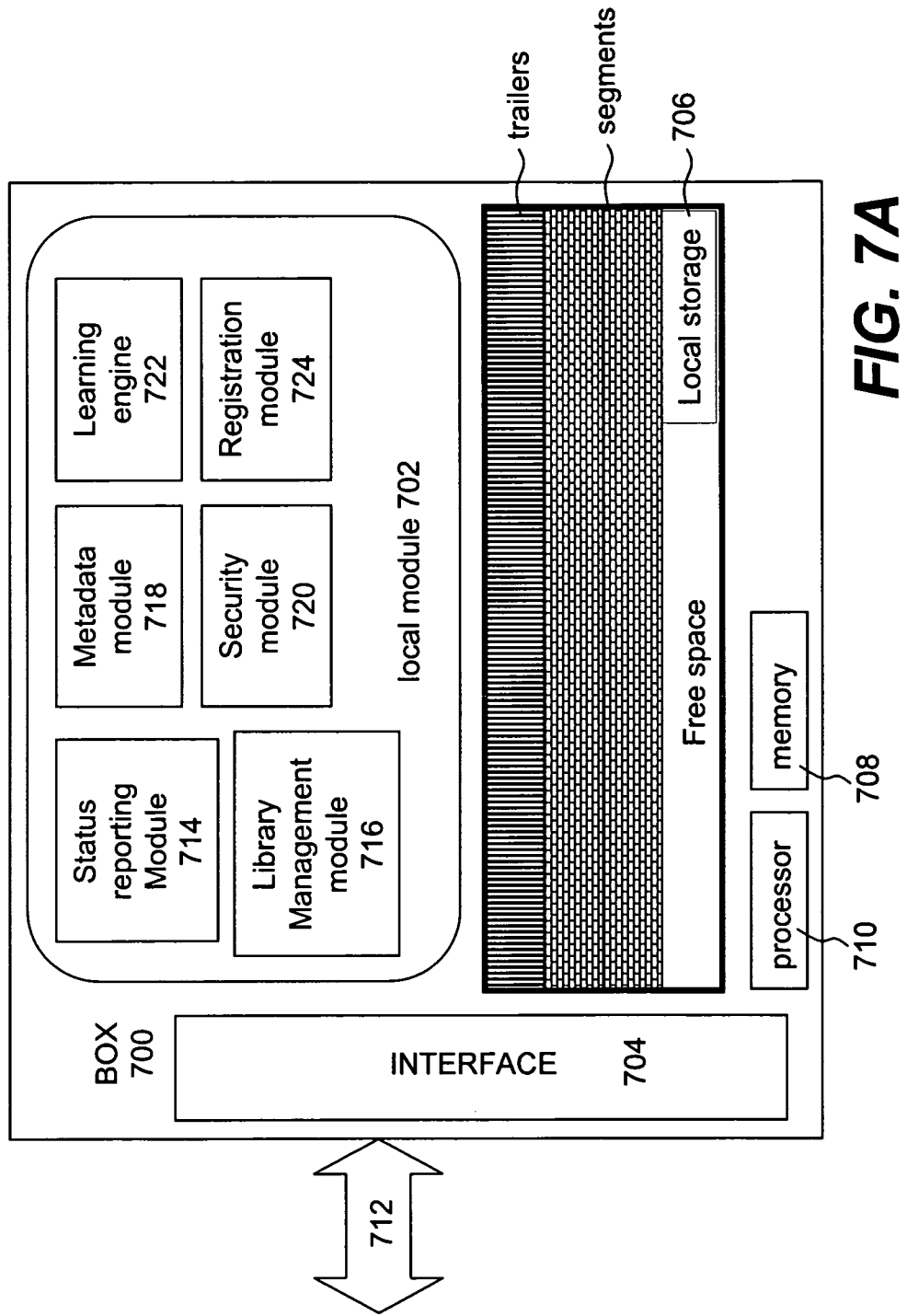
FIG. 7A shows one exemplary implementation of a box that may correspond to any one of the boxes of FIG. 2A.

Referring now to FIG. 7A, there shows one exemplary implementation of a box 700 that may correspond to any one of the boxes (e.g., 207-1, 207-2 and 207-n) of FIG. 2A. The box 700 includes a local module 702, an interface 704, and a storage space 706. The local module 702 is loaded in a memory 708 and executed by a processor 710 to perform its operations. In operation, the box 700 may be provided to a subscriber or user by a service provider or an enterprise offering media services to users. Through the network 712, the box 700 can receive the media services provided by a server (e.g., the server 600 of FIG. 6A). As stated above, examples of the box 700 may include, but not be limited to, a desktop computer, a laptop or notebook computer, a set-top box, a portable device such as a telephone, tablet PC or PDA, etc. The network 712 is preferably a broadband local loop that uses one or more of xDSL, ATM, SONET, fiber optic lines, a private/public telephone network, a wireless connection, or CAT-5. The box 700 is coupled to the network 712 by way of a circuit-switched or packet-switched connection.

As shown in FIG. 7A, there are a plurality of modules that are configured to work cooperatively with each other. It is understood to those skilled in the art that not every module listed in the local module 702 of FIG. 7A must be employed. Depending on actual implementation or needs, the modules may be selectively deployed.

Status reporting module 714 is provided to monitor various statuses affecting the box 700. In one situation, whenever the IP address of the box 700 is changed, the status reporting module 714 reports the new IP address immediately to the server. In another situation, the status reporting module 714 is configured to detect how long the box has been out of the network so that a library in the box can be appropriately updated in a timely fashion. In still another situation, the status reporting module 714 detects the available uploading bandwidth. If the uploading bandwidth is below a certain number, the status reporting module 714 will inform the server in a timely manner so that the box is not to be designated to supply a segment to other boxes. In yet another situation, the status reporting module 714 detects if a segment being fetched from a supplying box is no longer at a desired speed, the status reporting module 714 may cause a communication session to be terminated with the supplying box, and activate a communication session with another supplying box. Other functions performed by the status reporting module 714 may be appreciated in the detailed description herein.

Library management module 716 is provided to manage segments for the many titles in the storage space 706. Through the library management module 716, the server knows what objects the box has. The library management module 716 also dictates what distributed objects (i.e., missing segments) are to be fetched in reference to an ordered title. As the box fetches or receives segments of new and changing titles, the library management module 716 manages them. It will be appreciated that the library management module 716 may communicate with the server to keep the server up to date on available segments to supply to ordering boxes. Such communications may occur after each event (such as receiving a new segment), at predetermined intervals, and/or the like.

Metadata module 718 is provided to facilitate various interactions between the box 700 and a user thereof. The metadata module 718 may be implemented to provide various graphic interfaces to allow the user to browse metadata about the library in the box 700. The metadata may include, but not be limited to, associated information about actors, directors, reviews, blurbs, ratings, etc. about the titles in the library. In one embodiment, the metadata module 718 accepts entries from the users and display desired information in accordance with the entries. In an exemplary application, a user enters one or more characters. The metadata module 718 goes through the metadata and provides a list of titles in accordance with the entered characters. As more characters are entered, the list is progressively narrowed so that a selection of a title may be made easier. In another exemplary application, the metadata module 718 allows a user to specify a type of a title (e.g., action or romance), a list of titles pertaining to the type is displayed so that a selection of a title may be made.

The security module 720 is provided to facilitate secured communications with the server as well as other boxes. In one embodiment, as soon as one of the designated boxes accepts a request from the ordering box to supply a segment, a secured session between the ordering box and the supplying box is established. Consequently, all data transmitted therebetween is secured. The security module 720 is also provided to handle DRM and security of any data for the playback of the ordered title.

Learning engine 722 is provided to best serve users from the viewing behavior of a user and/or network behavior of the box associated with the user. From what a user has browsed, selected or ordered, a list of recommended titles may be automatically generated for the user. Also from the viewing behavior, the learning engine 722 can configure the box to decide which segment(s) to cache locally. In a situation in which a box is offline for a period of time, when the box is back online, the learning engine 722 can configure the box to update the library by prioritizing the titles to be fetched. By acquiring the network behavior of the box, the learning engine 722 knows what bandwidth may be available at different times in a day, which may facilitate the designation of the box to supply segments to other boxes or seeding of the box with releases from the server.

Registration module 724 allows new users to register with the system. Typically, after a user is successfully registered, the registration module 724 is configured to forward the registration information to the server for centralized management. In operation, the registration module 724 acts as a frontline to guard the system, requiring, for example, a username and password. A user must be authenticated by the registration module 724 before an order can be accepted.

Figure 7B:
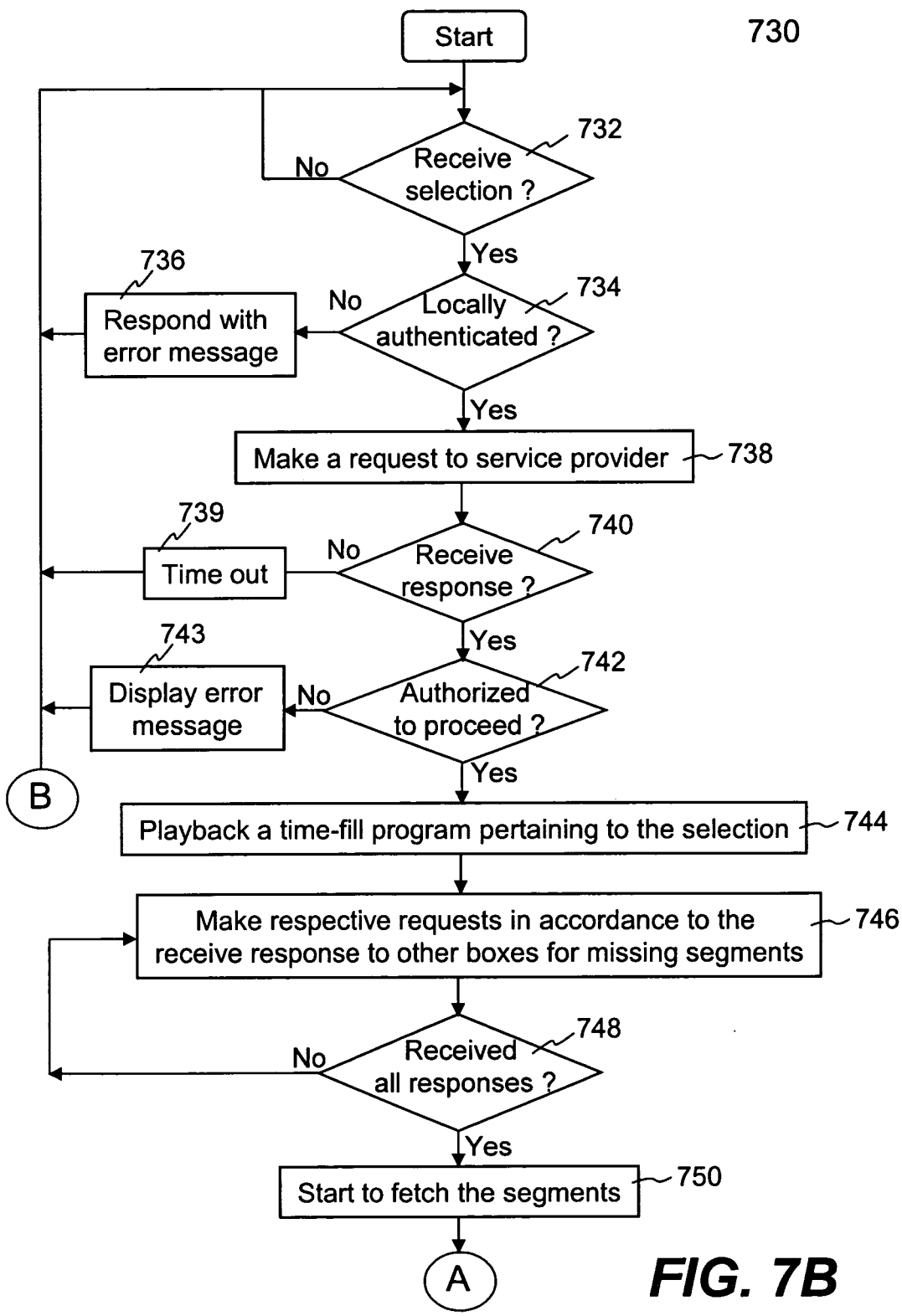
FIG. 7B and FIG. 7C collectively show a flowchart or process of starting an instant playback of a selection (i.e., a title) according to one embodiment of the present invention.
Figure 7C:
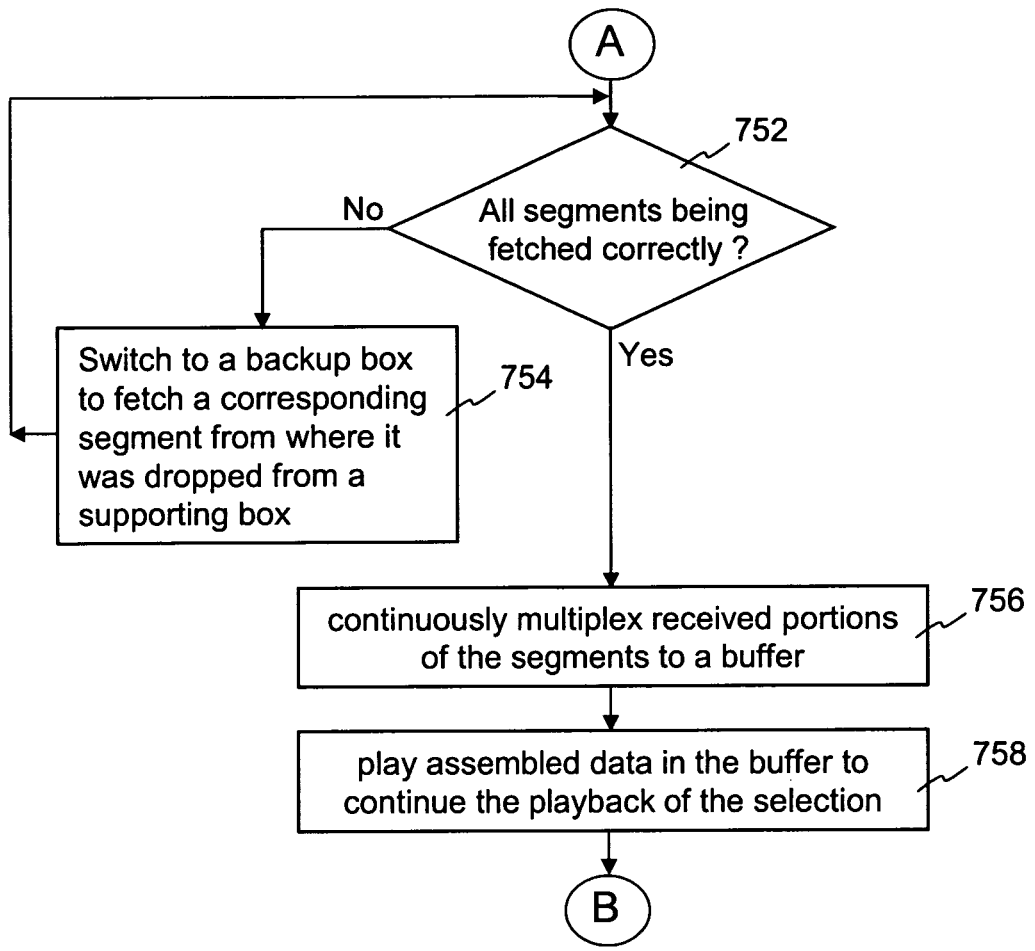

Referring now to FIG. 7B and FIG. 7C, both figures collectively show a flowchart or process 730 of starting playback of a selection (i.e., a title). The process 730 may be implemented in software, hardware or a combination of both as a method, a process, and/or a system. Preferably, the process 730 is executed in a computing device that may correspond to a box as used herein. Working in conjunction with the process 686 of FIG. 6G, the process 730 enables playback of a file pertaining to a selected title from a box, wherein the file is not completely available at the time of the playback.

At 732, the process 730 awaits a selection from a user. In one case, a user views a display with a plurality of titles from which the user may activate a key (e.g., on a remote control or keyboard) to choose one of the titles. The process 730 is activated when a selection is made by the user. The process 730 goes to 734 to determine whether the user and/or box is properly authenticated. In one embodiment, a registered user is required to input a username and a password for authentication. In another embodiment, a registered user is required to enter a code for authentication. There may be other ways to authenticate a user. In any case, the process 730 needs to ensure that a user and a box is legitimate. If not, the user is sent an error message at 736 that may recommend that the user register with the system.

After a registered user has been authenticated at 734, the box sends a request at 738 in accordance with the selection. The request includes information about the order and the user. The request is transported to the server by a service provider. Upon receiving the request, the server proceeds with process

686 of FIG. 6G. Meanwhile, the box awaits a response from the server at 740. The request may be re-sent if a response is not received within a predefined time (e.g., 5 seconds). However, if the response is not received beyond a certain time (e.g., the network is down), an error message will be displayed at 739.

At 742, the response is received from the server. For proper reason, the response may restrict the user from using the system. If the user is restricted, the process 730 goes to 743 to display an error message to the user. Upon authorization, the process 730 goes to 744 where a time-fill program may be displayed via a display utility. One of the purposes of the time-fill program is to provide a time in which sufficient data from the distributed segments can be received to start a smooth playback of the ordered title. In one embodiment, a time-fill program includes one or more trailers or previews pertaining to an ordered title. For example, if the ordered title is "G" rated movie, the time-fill program is compiled to include trailers or previews suitable for general audience. In another embodiment, the time-fill program includes commercial or promotion information (e.g., products or services). In still another embodiment, the time-fill program is configured locally adaptive to a number of factors including reliable playback of an ordered title in view of any particularities/characteristics of the ordering box, particularities/characteristics of the title being ordered (e.g., the rate at which the title is encoded, how many high bit-rate action scenes are present at the beginning of the title, the minimum data to be fetched to guarantee smooth playback of the title and a minimum buffer size of unplayed data), the network connection and history of reliability (e.g., past, recent or particular time of day, etc.), and perhaps even user configuration of the box. In any case, a time-fill program (e.g., a trailer) is preferably complete before the playback of the ordered title starts.

In operation, there are many ways to determine the exact items or content in a time-fill program. In one embodiment, the content in a time-fill program is closely related to what is ordered. For example, a number of R-rated trailers may be assembled in a time-fill program when an R-rated movie is ordered, a number of related trailers by a director or main characters may be assembled in a time-fill program when a movie by the director or the main characters is ordered. Referring now to FIG. 7F, there shows a time frame 790 for a time-fill program for a particular box. The time frame 790 defines a minimum time the box needs to stabilize data that is being streamed in from one or more boxes. It is assumed that there are six commercial programs A1, A2, A3, A4, A5 and A6 that are locally available for assembling the time-fill program. To convey the information efficiently, the programs are different in length. Given the time frame 790, it is not likely to put all of the six programs in the time-fill program. According to one embodiment, an auctioning mechanism is provided to allow sponsors of these programs to decide when and how their programs are shown to a user. The service provider may determine a respective price for each of the slots in the time-fill program. Typically the first slot is the most expensive as a program gets most attention from a user after the user has just placed an order. FIG. 7F shows that the sponsors of programs A2, A3, A5 and A4 desire respectively the first slot, the second slot, the third slot and the fourth slot in the time-fill program. It should be noted that the determination or acceptance of a program for the last slot (e.g., the fourth slot) is subject to the time frame 790. It is not desirable to exceed too much the time frame 790 in order to accommodate all desired commercial programs. The assembled time-fill program 792 in FIG. 7E shows that a small extended time beyond the time frame 790 is added to include a complete program A4.

Referring now back to FIG. 7B, at 746, in accordance with the response from the server, the box makes respective requests to other boxes for missing segments. As described above, the response includes source information indicating where the box can fetch the missing segments. For example, if there are four segments for a file and the box stores two of the segments locally, then two segments must be fetched from other boxes. At 748, the box awaits a response from the boxes being requested to supply the missing segments. If one of the boxes is unable to respond to the request, a backup box may be called upon to supply the segment. If the backup box is also unable to respond to the request, the box will send a request to the server for additional backup boxes. In any case, after the designated boxes respond to the requests from the ordering box, the ordering box at 750 starts to fetch the missing segments from the designated and responded boxes.

As described above, the missing segments are expected to arrive at a predetermined speed. If, for some reason, a portion of the network is congested or the box itself is malfunctioning, causing a significant slowdown of the segment being fetched, the process 730 goes to 754 where a backup box is called in to continue supplying the segment being interrupted. The details of 752 and 754 are further described in FIG. 7E.

Figure 7D:
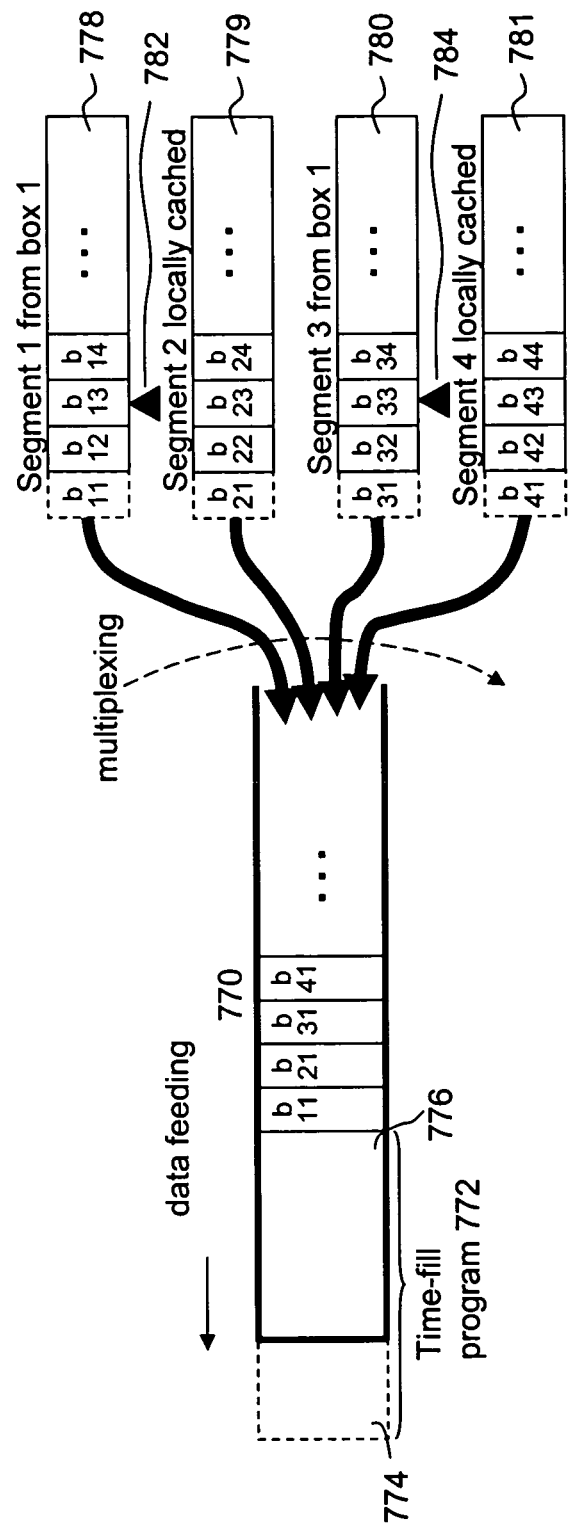
FIG. 7D shows the multiplexing of four streams of segments to generate a data stream for playback when a time-fill program is finished according to one embodiment of the present invention.
Figure 7E:
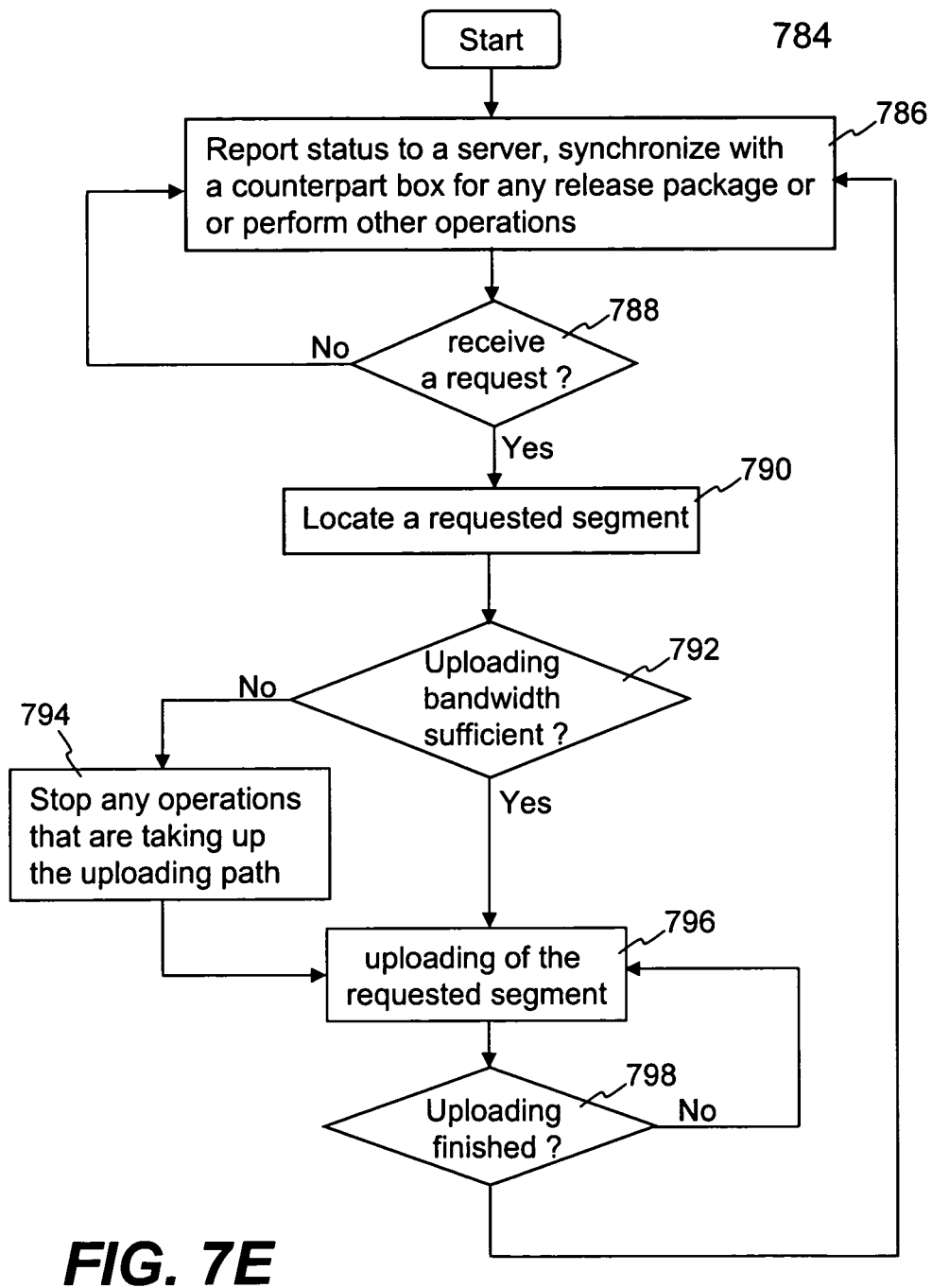
FIG. 7E shows a flowchart or process of prioritizing tasks in a box according to one embodiment of the present invention.
Figure 7F:
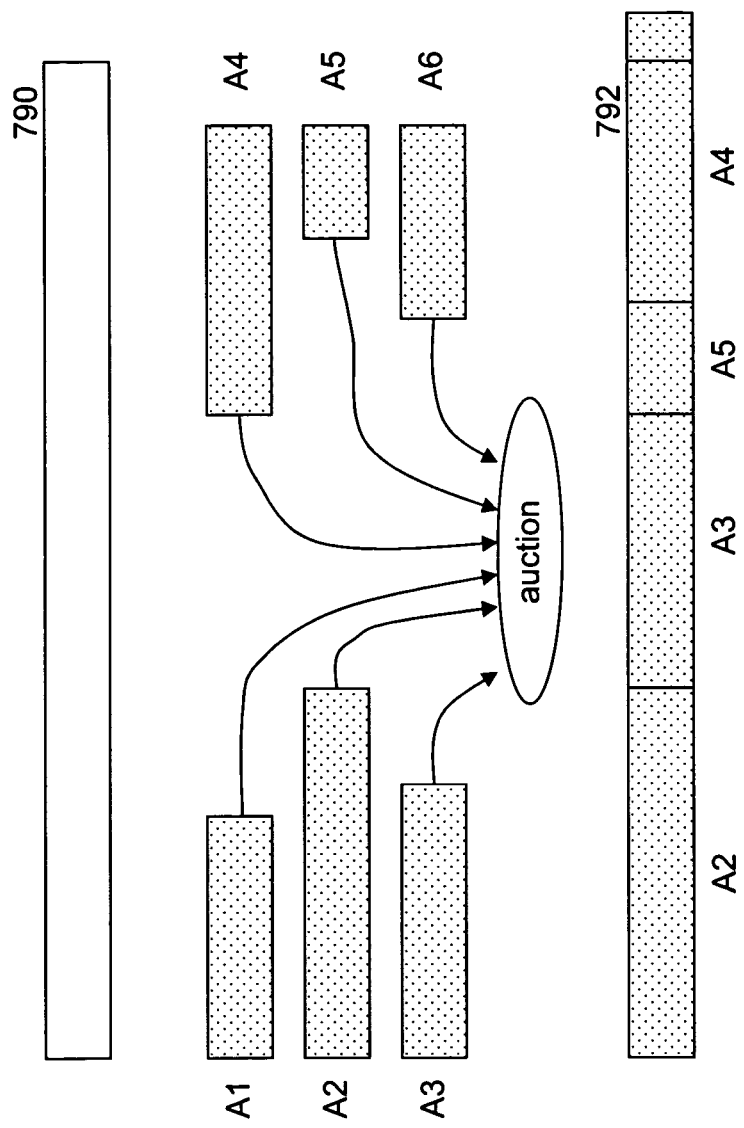
FIG. 7F shows an embodiment of auctioning slots in a time-fill program.

If all segments are streaming at predetermined minimum speeds, then, at 756, portions of the segments locally stored and the portions of the segments being streamed in are multiplexed into a buffer as shown in FIG. 7D. A buffer 770, preferably part of the memory 708 of FIG. 7A, is loaded with data of a time-fill program 772. As shown in FIG. 7D, a portion 774 of the time-fill program 772 has been played out of the buffer 770. The remaining portion 776 of the time-fill program 772 is yet to be played. At the same time, the streaming of segments 778 and 780 is being fed into the buffer 770. Segments 778-781 (including the segments locally stored and the segments being streamed in) are multiplexed into the buffer 770. More specifically, a block of data from segment 1, a block of data from segment 2, a block of data from segment 3 and a block of data from segment 4 are multiplexed and successively fed into the buffer 770. As a result, the original order of the data is restored and the remaining portion of the file pertaining to the title is assembled.

Referring back to FIG. 7C, the process 730 goes to 758 to continue playback of the assembled data in the buffer until the entire file for the ordered title is played. The process 730 then goes back to 732 to await another order from the user.

Referring back to FIG. 7D, there show two pointers 782 and 784. Each of the pointers 782 and 784 is used to remember where the data block of a segment is being fed or about to be fed to the buffer 770. In the event, the segment being fetched from a box is interrupted and a backup box is stepped in, the ordering box knows exactly where to start fetching the segment from where it was interrupted in accordance with the pointer. Likewise, similar pointers (not shown) may be provided to remember where the data block of the locally cached segment is being fed or about to be fed to the buffer 770. In the event, the ordering box needs to be reset or is suddenly powered off and back on, these pointers can facilitate the continuation of the playback of the ordered title from the position that the interruption occurred.

It has been described that a box may execute a number of tasks such as facilitating a search of a desired title among all titles in a library, fulfilling an order from a user, supplying one or more segments to other boxes, updating the library in responding to a release, and reporting its status or network status to a server. Although all tasks are equally important, some may be prioritized ahead of others.

Referring now to FIG. 7E, there shows a flowchart or process 784 of prioritizing tasks in a box according to one embodiment. It should be noted that the process 784 may make the system more efficient. Upon install, a box is not requested to supply or upload a segment to another box. The box is configured to report at 786 its status to a server (e.g., 202 of FIG. 2A) periodically or at a predefined time, synchronize with a counterpart box for updating a release to its library or perform other operations that may affect the overall performance of the box. When reporting to the server, the box sends out a status that may indicate its working condition. In one embodiment, the box is coupled to a public network and assigned a dynamic IP address. To ensure that the box is in communication with the server and other boxes, the box is configured to report any IP address change to the server.

The box either enters a waiting mode or performs other operations at 786. As the box may be a candidate to supply one or more segments to an ordering box, at 788, the process 784 checks whether the box has been requested to supply any segment to another box. If there is no such request received, the box returns to 786 to keeping on doing whatever it was doing. However, upon receiving a request from an ordering box at 788, the process 784 goes to 790 to locate a requested segment among many segments residing in the box. At 792, the box checks whether the uploading bandwidth is sufficient. It is assumed that the uploading bandwidth available at the time of the request is W and the bandwidth required to upload the segment is R. If W>R, the process 784 goes to 796, which means any operations, if there are any, that are using the uploading bandwidth are not concerned. If W<R, the process 784 goes to 794 where any other operations, if there are any, that are using the uploading bandwidth are stopped immediately. Example operations that may take uploading bandwidth include uploading a release package requested by a counterpart box or seeding a new box.

After such operations are suspended, the process 784 goes to 796 to upload the requested segment to the ordering box. At 798, it is determined whether the uploading of the requested segment is finished. If not, the uploading is continued. When the requested segment is finished uploading, the process 784 goes to 786 to restore or continue what the box was doing or is supposed to be doing.

It should be noted that the process 784 is described for uploading one segment. Those skilled in the art will understand that the process 784 is applicable to uploading more than one segment if the uploading bandwidth permits. It is described above that more than one segment for a top band typically resides in a box. When the uploading bandwidth of a box to the ordering box is sufficient to upload more than one segment, in one embodiment, such box may be designated to upload more than one segment so that the playback of a selected title depends less on other boxes.

Figure 8:
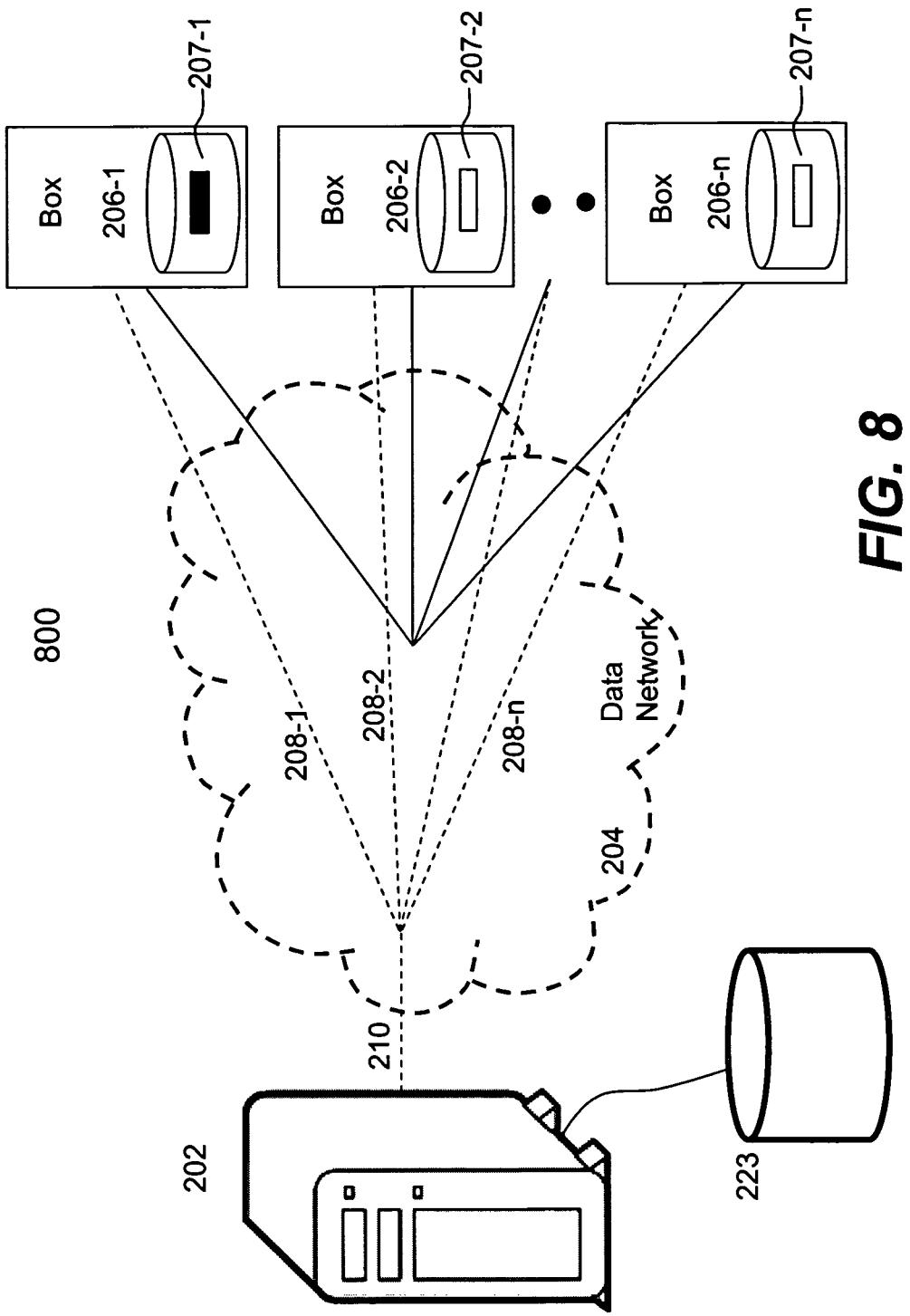
FIG. 8 shows an architecture in which many aspects of the present invention are equally applied thereto.

FIG. 8 shows an architecture 800 in which many aspects of the present invention are equally applied thereto. The architecture 800 may include all the functionality of the architecture of FIG. 2A. As an enhancement to the architecture of FIG. 2A, the architecture 800 includes a server database storing all distributed objects. By storing the distributed objects, the server may support ordering boxes when backup boxes fail, as an initial backup box, when bandwidth is available, etc.

It should be appreciated that the server, in response to a request for a title by an ordering box, need not respond directly to the ordering box. The server 202 may respond by providing instructions to distributed boxes to provide distributed objects to the ordering box. The server 202 may respond by requesting distributed boxes to volunteer their services. Many other possible responses by the server are also possible. It should be further appreciated that requests by ordering boxes need not go to the server. For example, boxes may be given network configuration maps, so that the boxes can make requests directly to other boxes, thereby avoiding using server bandwidth for playback requests.

One skilled in the art will recognize that elements of the system may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier wave. The computer-readable media can also be distributed over network-coupled computer systems so that the computer-readable code is stored and executed in a distributed fashion.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. For example, in one embodiment, when an order of a title is placed, the server may identify the sources that will supply data for the order, and then contact these suppliers itself to initiate data transfers, instead of requiring the ordering box to initiate communication with the sources. In fact, an ordering box could even dynamically obtain the source information from boxes that cache respective segments for the title instead of requiring the server to identify the supplying boxes. Accordingly, the scope of the present invention is defined by the appended claims rather than the foregoing description of embodiments.

We claim:

1. A system for providing video-on-demand services, the system comprising:

a plurality of devices, coupled to a network, each of the plurality of devices including a storage element for storing data segments corresponding to a plurality of media content, and wherein each of the plurality of devices is configurable to generate a request for playback of a selected one of the plurality of media content; and a server coupled to the network and configured to:

classify the plurality of media content into at least a first group and a second group, the first group corresponding to a plurality of media content that is selected as being more popular than a plurality of media content in the second group;

generate data segments each including a plurality of non-consecutive data blocks selected by decimated sampling of the plurality of media content; wherein the data segments have a number equal to the smallest integer that is larger than a ratio of a download rate of the plurality devices divided by an upload rate of the plurality of devices;

distribute the data segments corresponding to the plurality of media content to the plurality of devices by distributing more data segments of the plurality of media content in the first group than data segments of the plurality of media content in the second group to the plurality of devices so that at least one data segment of each media content in the first group is stored in the storage element of each of the plurality of devices;

provide a response to a request for playback of a selected media content from a first devices of the plurality of devices, the response including source information identifying a set of devices from the plurality of devices designated to provide a plurality of distributed data segments corresponding to the selected media content to the first device.

2. The system of claim 1, further comprising a plurality of backup devices, wherein each of the plurality of backup devices is configurable to provide a copy of at least one of the plurality of distributed data segments pertaining to the selected media content to the first device.

3. The system of claim 1, wherein the response further includes authentication information to facilitate secured communications between the first device and the set of designated devices.

4. The system of claim 1, wherein the plurality of distributed data segments sand the local data segment are encrypted, and wherein the response further includes security information to enable the plurality of distributed data segments and the local data segment to be decrypted.

5. The system of claim 1, wherein the set of designated devices is selected based on at least one of: (i) a geographic location, (ii) a time zone, and (iii) a working status of each of the set of designated devices.

6. The system of claim 1, wherein the first device is further configured to determine a number of distributed data segments required to facilitate continuous playback of the selected media content, and to determine a first duration of time needed to retrieve the number of distributed data segments from the set of designated devices.

7. The system of claim 6, wherein the first device is configured to determine whether to initiate playback of at least a first or second commercial media content other than the selected media content, wherein the determination is based, at least in part, on (a) a real-time determination of the first or second commercial media content using one or more bids that are submitted by sponsors of the respective first or second commercial media content and (b) the selected media content; and wherein the first devices is further configured to provide playback of one of the first or second commercial media content, based on the determination, when playing back the selected media content on-demand on the device; and wherein the first device is further configured to adjust a duration of playback of the first or second commercial media content to be greater than or equal to the first duration of time.

8. The system of claim 7, wherein the first or second commercial media content further includes at least one of: (i) texts, (ii) pictures, (iii) movie trailers, and (iv) previews.

9. The system of claim 8, wherein the first or second commercial media content is comprised of a sequence of slots, and wherein a price established by a service provider for showing content in each slot of the sequence of slots is based on the position of the slot in the sequence.

10. The system of claim 7, wherein the first devices is further configured to: (i) initiate playback of the first or second commercial media content while concurrently retrieving the plurality of distributed data segments from the set of designated devices, and (ii) play back selected media content once playback of the first or second commercial media content in completed.

11. The system of claim 1, wherein the server is further configured to reclassify at least one of the plurality of media content in the first group as being in the second group.

12. The system of claim 1, wherein the server is configured to classify the plurality of media content into at least the first group and the second group based on at least one of: (i) ages of the plurality of media content, (ii) statistics of viewing behavior, and (iii) user ratings.

13. The system of claim 1, wherein the server is configured to generate the data segments each including the plurality of non-consecutive data blocks selected by decimated sampling of the plurality of media content such that the data segments are effective to all be streamed to the first device at the same time and be played back by the first device as the data segments are all being received by the first device.

14. The system of claim 1, wherein the server is configured to generate the data segments each including the plurality of non-consecutive data blocks selected by decimated sampling by:

including in each segment every Nth data block of the media content, each segment starting at a different data block in the media content.

\* \* \* \* \*